(12) United States Patent  
Hoffland

(10) Patent No.: US 7,005,068 B2  
(45) Date of Patent: Feb. 28, 2006

(54) METHOD AND APPARATUS FOR TREATING ANIMAL WASTE AND WASTEWATER

(75) Inventor: Robert O. Hoffland, Conroe, TX (US)

(73) Assignee: Hoffland Environmental, Inc., Conroe, TX (US)

( * ) Notice: Subject to any disclaimer, the term of this patent is extended or adjusted under 35 U.S.C. 154(b) by 0 days.

(21) Appl. No.: 10/679,770

(22) Filed: Oct. 6, 2003

(65) Prior Publication Data

US 2004/0159608 A1    Aug. 19, 2004

Related U.S. Application Data

(63) Continuation-in-part of application No. 09/789,265, filed on Feb. 20, 2001, now Pat. No. 6,630,072.

(51) Int. Cl.  
*C02F 3/30* (2006.01)

(52) U.S. Cl. .............. 210/603; 210/609; 210/612; 210/614; 210/630; 210/631; 210/198.1; 210/259; 210/903; 210/908; 210/DIG. 9

(58) Field of Classification Search .............. 210/603, 210/605, 609, 612, 630, 631, 198.1, 252, 210/259, 903, 908, 912, DIG. 9, 614  
See application file for complete search history.

(56) References Cited

U.S. PATENT DOCUMENTS

| | | | | |
|---|---|---|---|---|
| 2,154,132 A | * | 4/1939 | Mallory | 210/614 |
| 3,933,628 A | * | 1/1976 | Varani | 210/603 |
| 3,981,800 A | * | 9/1976 | Ort | 210/603 |
| 5,626,755 A | * | 5/1997 | Keyser et al. | 210/614 |
| 6,409,788 B1 | * | 6/2002 | Sower | 71/11 |
| 6,451,206 B1 | * | 9/2002 | Charbonneau | 210/170 |
| 6,454,944 B1 | * | 9/2002 | Raven | 210/603 |
| 6,558,548 B1 | * | 5/2003 | Svirklys et al. | 210/603 |
| 6,572,771 B1 | * | 6/2003 | Yamasaki et al. | 210/605 |
| 6,630,072 B1 | * | 10/2003 | Hoffland | 210/620 |

FOREIGN PATENT DOCUMENTS

| | | | |
|---|---|---|---|
| EP | 0126722 | * | 11/1984 |
| WO | WO 93/15026 | * | 8/1993 |

* cited by examiner

*Primary Examiner*—Fred G. Prince  
(74) *Attorney, Agent, or Firm*—The Matthews Firm

(57) ABSTRACT

Novel methods and apparatuses are disclosed for the treatment of wastewater to reduce often associated offensive odors by promoting aerobic conditions through decreasing the amount of oxygen required to maintain aerobic cultures and/or aerobic biological activity in the wastewater. Also, the wastewater is screened or otherwise separated the wastewater to remove or concentrate the solids which are anaerobically digested. By concentrating the solids, a smaller digester can be used. The anaerobic digestion produces biogas that may be collected and used, or burned by a flare or oxidized by a semipermeable membrane to deodorize the biogas. The heat produced from the biogas may have a variety of uses, including raising the temperature of the anaerobic digester and the bacterial metabolism. The wastewater is also clarified to remove nitrogenous and organic carbon wastes.

43 Claims, 19 Drawing Sheets

METHOD AND APPARATUS FOR TREATING ANIMAL WASTE AND WASTEWATER

RELATED APPLICATIONS

This is a Continuation in Part of U.S. application No. 09/789,265, entitled "Methods and Apparatuses for Treating Wastewater," filed on Feb. 20, 2001, and now issued as U.S. Pat. No. 6,630,072.

FIELD OF INVENTION

This invention generally relates to apparatuses and methods for treating water and other fluids, including, but not limited to, agricultural and industrial waste water, utilizing a combination of screening and a benign, naturally occurring, biological processes to eliminate and cut the production of, often associated, offensive odors.

A covered anaerobic digester may also be used to reduce the volume of the organic mass. Additionally, the biogas produced by the anaerobic digester may be captured and used as an energy source. Next, under the presence of exogenous oxygen and/or surface or submerged aerators, convective flow occurs which causes circulation of the culture zones and cycling of the conditions for aerobic to anaerobic and from anaerobic to aerobic, enabling enhanced denitrification. Further, the treated wastewater may be used to flush the waste from the production floor and or sites where animal wastes are generated or collected, thereby minimizing the volume of additional water usage, and/or using the treated wastewater for agricultural irrigation.

BACKGROUND OF INVENTION

For purposes of this patent, the following terms are defined. As used herein, the term "conveyed" or "convey" means and refers to any system or process for directing, channeling, sending, spraying, blowing, moving, funneling, pouring, pumping wastewater or other solid or at partially liquid material. As used herein, the term "tank" means and refers to a bin(s), pond(s), container, area, and the like. As used herein, the term "trolley" means and refers to a bin, tank, collection site, collection vehicle, area, pile, and the like. As used herein, the term "pass," "passing," "passed," and other conjugations means and refers to convey, to direct and/or to transport via any method or structure common in the art such as a conduit, pipe, funnel, trough, line, slope, gully, trench, river, stream, and the like. As used herein, the term "lagoon" means and refers to a lagoon, pond, lake, stream, retention structure, facultative pond and the like, whether earthen or lined pit such as by concrete, plastic or metal and the like. When wild hogs roamed the forest in sparse numbers with the population determined by the available food sources, the environmental impact of the hog excretion was insignificant. The individual animal roamed freely, spreading his waste over large areas as he traveled. Later, when man domesticated hog and other livestock and as environmental regulations began to address such wastes, the disposal, treatment, and recycling of the, and increased the local concentration to correspond to the caretakers food production, the environmental impact of waste was at first minimal. The farmer removed the waste manure from the pig-sty and spread it over his farm for fertilizer.

In recent times, however, livestock production density has dramatically increased. For example, the specialty hog production operators purchased their hog feed (cereal grains) from other farmers who specialized in the production of grain cereal. This enables one operator to have the hog production facility of 10,000 head of hogs or more. The production of hog manure now becomes a problem. The spreading of large quantities of hog manure on land requires an extensive amount of land. The soil has a finite capacity to degrade animal feces, and when exceeded it becomes the equivalent of a pile of manure. The waste is often accumulated and dispersed over the cropland at specific times of the year. However, there are physical limitations on the distribution of the waste because it cannot be practically applied to near mature crops without the destruction of the crop. Also it cannot be applied when the waste may run off the soil because the soil is saturated or frozen. In fact, several states within the U.S. have created regulations prohibiting land application during the winter months.

In addition to the practical limits of the distribution of animal feces, regulatory agencies have applied limits on the amount of feces that may be spread. The regulations limit the amount of animal feces per acre to be about equivalent to the plant uptake of the non-biodegradable components. These regulations were created to prohibit the surface run-off from storm water and the excess percolation of the soluble waste components into the ground water.

In recent times, livestock producers have elected to create pits or lagoons for the collection of the waste. In the barns or houses, the animals live on elevated flooring which permits the feces to drop through the floor to a sub-floor. This sub-floor is periodically flushed to remove the feces and maintain a healthy living environment. The feces, with the wash down water as a vehicle, flow to the storage lagoon. The water utilized to flush the livestock production floor and move the freshly produced feces to the lagoon is usually recycled supernatant from the storage lagoon. Recycling the wastewater provides two advantages to the producer. First, it reduces that amount of fresh water that must be provided and secondly, since it is recycled from the storage lagoon, the size of the storage facility can be significantly reduced.

The problem with the recycled water is that it contains high levels of ammonia (breakdown product of the waste urea) and odors, which are not beneficial to the health of the livestock. High levels of ammonia in the flush water require the building to be vented to reduce the ambient levels of ammonia. Increased ventilation lowers the ambient temperatures in the winter. The lower temperatures lower the rate of weight gain of the animals and increase the food requirement of the animal to maintain body temperature.

Biological cultures purify water by exploiting the metabolic processes of various bacterial and algal species to convert organic and inorganic waste products into benign end products, typically carbon dioxide and a reproduction of the species. However, intermediate products formed by biological processes can include methane and sulfur containing gases, volatile organic acids or other volatile or odiferous products, depending on the nature of the culture, the waste being digested and the ambient environment.

Biological cultures can be fostered of desirable microorganisms, which provide the functional basis for the wastewater treatment by metabolically converting the waste products. However, cultures of undesirable microorganisms which produce undesirable tastes, odors, growths, or which are actually toxic are also possible. Therefore, it is important in biological wastewater treatment that cultures of suitable microorganisms are fostered and the undesirable cultures avoided.

The organic material in the wastewater serves both as an energy source and a source of carbon for cell synthesis by the microorganisms of the culture. Microorganisms are both reactants and products in the biological treatment of wastewater. Typical configurations of biological reactor cultures for purifying water include suspended culture processes and attached growth systems such as fixed-film reactors. Suspended cultures include activated sludge (facultative cultures), aerated lagoons, oxidation ponds, and anaerobic cultures.

The oxygen level present in the culture material affects biological digestion of organic waste material because the oxygen level determines the metabolic pathway available to the microorganism. Aerobic conditions provide plenty of oxygen to the culture, and foster the growth of microorganisms that can use the exogenous oxygen as a terminal electron acceptor in the oxidation of organic acids generated form the metabolic breakdown of organic material, i.e. aerobic biological activity. If insufficient exogenous oxygen is available to the culture, the conditions are anaerobic. Under anaerobic conditions, the absence of oxygen as a terminal electron acceptor results in the excretion of organic acids into the culture medium as waste.

Farmers often create storage lagoons on their farms to accumulate and store the flushed wastewater, feces and urine until an appropriate time to distribute the wastes over the land. The surface water is utilized as flush water not only to reduce the amount of water consumed by the animal production, but also to conserve the capacity of the lagoon. Using the lagoon water for flushing reduces the water consumption by 70–90% and proportionally reduces the required size of the lagoon. The wastewater is usually stored until planting time and applied to cropland in place of a commercial fertilizer.

Currently, during the storage process, due to the large volume of animal waste entering the lagoon, there is insufficient oxygen present to support the growth of aerobic cultures and/or aerobic biological activity. In the absence of the desired oxygen, the microbial growth in the lagoon converts to anaerobic activity. This anaerobic activity leads to what is commonly known as a "septic" lagoon. In a septic lagoon a very foul odor is present from the production of hydrogen sulfide, organic-sulfide compounds, organic acids, and etc. When the accumulated waste liquid is distributed over the cropland by spray irrigation, the foul smelling volatile gases are liberated, producing a very undesirable environment.

Aeration equipment can be installed to provide sufficient dissolved oxygen to maintain an aerobic culture. However, the energy cost to operate the aerobic treatment is very cost prohibitive. There are several methods of aeration available. Surface aerators are commonly used in large open areas. The surface aerator consists of an electric motor driven impeller suspended in the throat of a venturi with the entire unit mounted on a float to suspend the impeller just below the surface. As the impeller spins, it pumps the water up forming a large circular spray. Oxygen is dissolved in the water as it falls through the air. The amount of water spray and subsequently the amount of oxygen dissolved is directly proportioned to the amount of water pumped and therefore the horsepower of the motor and energy consumed.

Another commonly used method to increase the dissolved oxygen content of the lagoon is to blow air thorough an aeration system located on the bottom of the pond. The air is forced through a device with small openings to create small bubbles. As the bubbles rise through the liquid, oxygen is dissolved in the water. Again the amount of oxygen dissolved is directly proportional to the amount of air forced into the basin and therefore the horsepower utilized and energy consumed.

With these methods, it is possible to provide enough energy to supply sufficient oxygen to maintain an aerobic culture, but such methods are not entirely practical. The average waste generated by swine production is 3.1 pounds of BOD and 8.4 pounds of COD per day per 1000 pounds of livestock. This amount would be very cost prohibitive with the prior art methods.

Other methods that have developed that concentrate on screening the undissolved particles from the wastewater prior to flushing. Typically, the flush water will consist of both dissolved ingredients and suspended undissolved solids or particles (undissolved ingredients). These undissolved particles are of varying size from sub-micron to much larger visible particles.

There are a variety of screen separators being used in the art field for such screening. However, the screens only remove about 15–20% of the organic mass. These large particles that can be screened are insignificant in the treatment process because removing only 20% of the organic mass will only reduce the energy consumption by 20%. Various types of screen—gravity inclined screen, inclined screens with roll compactor, rotating screens, screens with drag chains, have been utilized with either wedge wire construction or perforated metal construction and types produce essentially the same results in that most of the particles are too small to be removed by screen-separating devices. In any case, the majority of the fecal matter is unscreened and left to produce the foul smell and septic environment as heretofore described.

The foul odors of wastewater become apparent in most operations, including, but not limited to:

(a) When the stored water is returned to the barns as flush water, odors are liberated;

(b) Spray operations: when the wastewater is applied to the cropland by spray irrigation (most common method), the liquid is pumped under high pressure through a nozzle and sprayed over large area. The spray area as well as all areas downwind has a putrid odor and is very undesirable;

(c) Winter thermal changeover: In the winter to spring of the year, the normal thermo dine of the lagoon is disturbed. Due to the temperature differences the bottom layers roll to the surface, creating an extra heavy liberation of noxious odors. Another disadvantage of the temperature change and decreased temperature in the lagoon causes a decrease in the metabolic rate of the bacteria which are utilizing the carbon and nitrogen as food nutrients on energy; and (d) the like.

Over the past few decades, more people have found it desirable to live in a country atmosphere rather then the conventional city life resulting in a greater number of people living near agricultural centers. The foul odor emanating from the anaerobic lagoons and spray fields has increasingly become a major area environmental issue. For example, the state of North Carolina has recently passed a moratorium prohibiting the creation of any new anaerobic lagoons. In fact, new rules are being created to phase out the use of all anaerobic lagoons because of the environmental and social problems. Other areas have proposed methods for the treatment of agricultural wastewater using biological techniques, the problem of odor and the economical removal of the source of the odor has not been addressed. The foul odor can be altogether prevented or mitigated by collection and use of the biogas or by semi-permeable membranes that oxidize and deodorize odors. Also, the biogas comprises as useful energy source that can be used for energy, to generate electricity, and to even speed the rate of reaction by raising the temperature of the wastewater, for example, the anaerobic digester.

A few relevant prior art patents are as follows:

U.S. Pat. No. 5,545,325 discloses a facility for combined aerobic and anaerobic treatment of livestock wastewater disclosure. This is accomplished with a natural solid-liquid separation device comprising a digester with an automatic skimmer installed at the upper part of the digester, and a level sensing control valve to control the volume of wastewater in the digester;

U.S. Pat. No. 5,480,548 discloses a wastewater purification process is disclosed including directing the wastewater through at least one aerobic zone and at least one anaerobic zone in repeating or alternating segments. A portion of effluent from the one or more anoxic zones are fed through at least one aerobic zone to which wastewater is fed and returned to the upstream portion of the anoxic zone;

U.S. Pat. No. 5,472,472 discloses a process for the bioconversion of soluble and suspended organics from animal waste wherein the wastewater is treated through a series of eco-reactors and bioreactors, including aerobic and anaerobic treatment. Soluble phosphorus is precipitated with metallic salts;

U.S. Pat. No. 4,824,563 discloses a method of treating high concentration organic wastewater in dependence upon microorganisms. The method includes an anaerobic operation tank, an aerobic tank and an ozone treatment tank;

U.S. Pat. No. 4,999,111 discloses a process for treating wastewater including aerobic, anaerobic, and anoxic treatment. The process of the '111 patent includes splitting the stream of wastewater into a main stream and a side stream wherein the anoxic treatment takes place in the side stream. Activated sludge is generated in the side stream and is recycled to the mainstream treatment process that includes at least one aerobic treatment zone.

These prior art patents do not fully solve many problems inherent with waste treatment and they fail to harvest the biogas as an energy source.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF THE INVENTION

For purposes of the description of this invention, the terms "upper", "lower", "right", "left", "vertical", "horizontal", "top", "bottom", and other related terms shall be defined as to relation of embodiments of the present invention as it is shown an illustrated in the accompanying Figures. Further, for purposes of the description of this invention, the terms "upper portion," "lower portion," "top," "bottom," and the like shall be defined to mean an upper portion and a lower portion and not specific sections. The terms "upstream" and "downstream" are intended to describe the connected relationship of the wastewater treatment modalities of the present invention, and are not intended to imply altitudinal or transformational relationship of the treatment modalities or the wastewater therein. However, it is to be understood that the invention may assume various alternative structures and processes and still be within the scope and meaning of this disclosure. Further, it is to be understood that any specific dimensions and/or physical characteristics related to the embodiments disclosed herein are capable of modification and alteration while still remaining within the scope of the present invention and are, therefore, not intended to be limiting.

Various embodiments of the present invention address problems associated with odors associated with the treatment of wastewater through reduction of solid and dissolved waste material.

Figure 1:
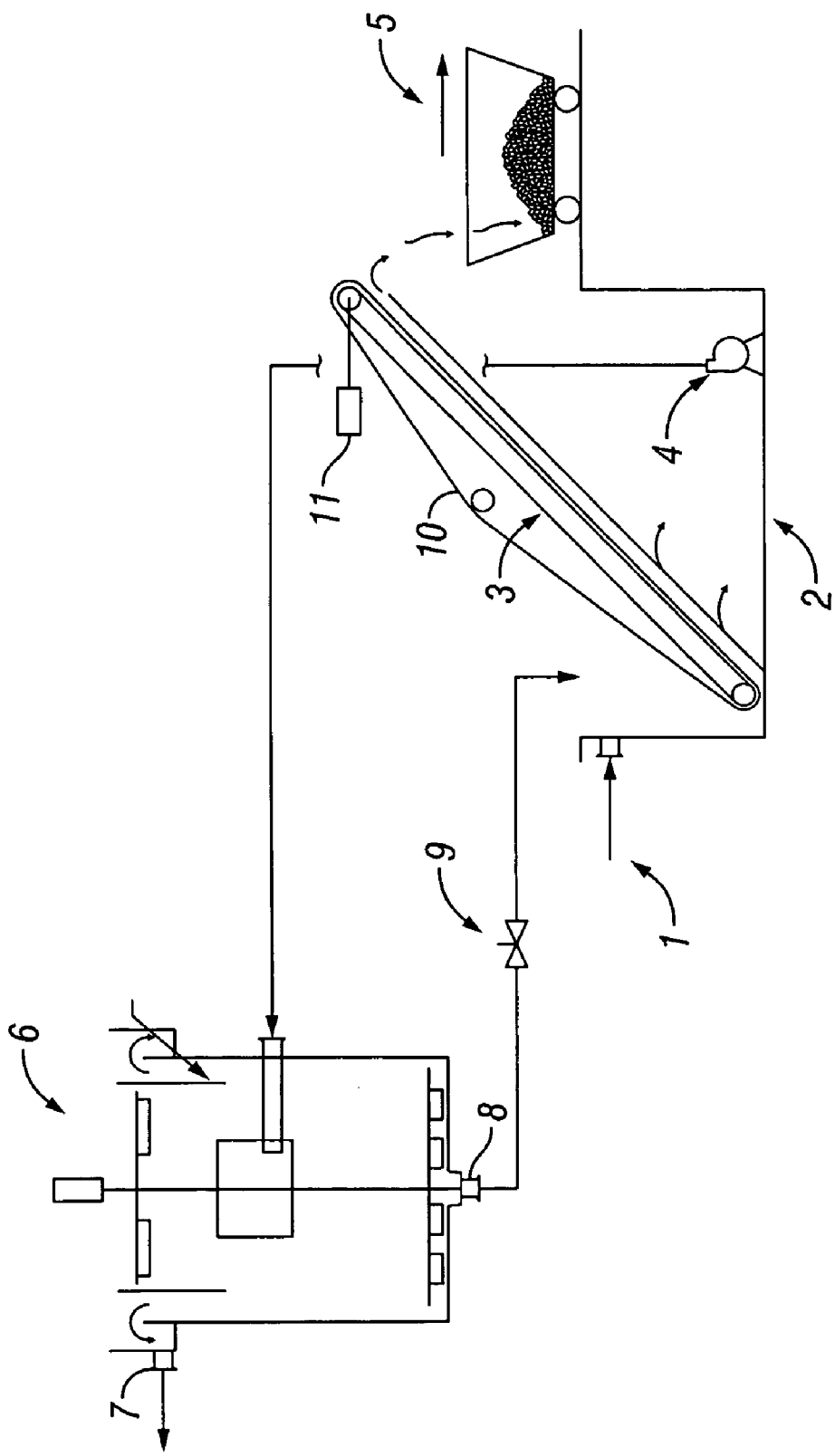
FIG. 1 is an illustration of an embodiment of the present invention.

Now referring to FIG. 1, an illustration of an embodiment of the present invention, an apparatus for treatment of wastewater is disclosed. In this embodiment, the present invention comprises a wastewater source 1, a grade screen separation device 3, a pit 2, a hopper 5, and a clarifier 6. Wastewater is conveyed to a pit 2 with a grade screen separation device 3. The wastewater may come from any source that comprises animal feces with at least one organic carbon component at least a portion of which is an insoluble solid and a nitrogenous waste,. Examples of sources include, but are not limited to, livestock production facilities; such as cattle, swine, goat, sheep, horse and the like, chicken ranches, duck farms, geese farms, human waste, and the like. Pit 2 may be of any depth dependent on several factors, including, but not limited to, the volume of wastewater treated, the available space, the size of device 3, and the like.

In fact, various embodiments do not use a pit 2, but rather, other suitable substitutes. Examples of suitable substitutes for pit 2 include bins, tanks, slopes, ponds, tables, and the like. Wastewater conveyed to pit 2 is screened to remove a portion of the solid material by grade separation device 3 such that a portion of a solid material is screened while a portion of the liquid material passes through the screen. Grade separation device 3 may be set in any orientation of inclination in relation to horizontal desired. In an embodiment, device 3 is horizontal. In other embodiments, device 3 is inclined or declined from horizontal. Further, device 3 may include a screen 10. Screen 10 may have holes or passages of varying size depending upon the size of solid material sought to be screened. Further, various embodiments may rotate screen 10 about a plane of orientation of device 3. In an embodiment, the screen is rotated about a portion of device 3 by pulleys and gears. In another embodiment, the screen is agitated or moved in alternating directions to sift solid material from the wastewater. The rotation, agitation, movement, locomotion and/or the like of screen 10 may be accomplished by a motor 11. However, any method or device common in the art may be used.

The solid material and/or particles collected on or about screen 10 may be conveyed out of pit 2 and off of device 3 into a trolley 5 or other device for collection. Once collected the solid material may be disposed of or used by any method common in the art. Screen 10 of device 3 may be of any size and/or the holes through screen 10 may be of any size. The more fine the screen holes are, or the smaller the holes in the screen, the more solid material that may be removed.

The liquid that is collected or left in pit 2 may then be conveyed to a clarifier 6. In an embodiment, the liquid conveyed is pumped into clarifier 6 by a pump 4. Various embodiments of the present invention utilize any variety of clarifier. In an embodiment, clarifier 6 is an elevated gravity flow clarifier. However, other embodiments use forced circulation and inclined clarifiers. Clarifier 6 acts further to remove solid and dissolved material from the wastewater.

In an embodiment, as the wastewater is clarified, a sludge collects about a portion of the clarifier. In one of the embodiments of this type, a sludge collects about the lower portion of the clarifier. The sludge may be drained or removed from clarifier 6 at a location 8. In various embodiments, the removed sludge may be conveyed back to pit 2 for further separation and disposal. In other embodiments, the sludge is used for a further process. The flow of removed sludge from clarifier 6 may be controlled by a valve 9 to limit the amount of material withdrawn from clarifier 6 or to control or select the time and/or conditions when sludge is removed from clarifier 6.

Various embodiments of clarifier 6 may include portions, pieces and apparatuses that are common in the art for the treatment of a wastewater. One example of an appropriate clarifier is a Hoffland-Environmental circular up-flow clarifier. However, other clarifiers may be used and will be readily known and apparent in the art.

To facilitate the removal of sludge collected about portions of clarifier 6 a variety of sludge rakes may be used either in combination or alternatively. One such example of a sludge rake includes, but is not limited to, a Hoffland-Environmental sludge rake. Various other embodiments of clarifier 6 may utilize a top scum rake to collect solid material above the bottom of clarifier 6. One such example is, but is not limited to, the Hoffland-Environmental scum rake. However, various embodiments may not use a top or a bottom scum rake.

As wastewater is treated in clarifier 6 a portion of the solid material may be removed from the wastewater such that wastewater may be further cleaned and solid particle and dissolved particle content reduced. In an embodiment, clarified wastewater is allowed to exit clarifier 6 about an opening 7. The clarified wastewater allowed to exit may be conveyed to a lagoon, holding pond, facultative pond, or other structure for further use or disposal. Various methods of collection and removal of clarified wastewater from clarifier 6 may be used and are well known in the art. In an embodiment, a portion of the clarified wastewater removed is recycled for further use in the wastewater treatment process and/or facility. In another embodiment, the wastewater in the lagoon is used for fertilization.

The treatment of wastewater by these various processes and apparatuses will reduce the solids contained in the wastewater thereby reducing the BOD and COD of the wastewater and consequently reducing the amount of oxygen necessary to maintain aerobic processes. The maintenance of an aerobic treatment process will reduce unpleasant odors and toxicity and make the further use of the wastewater more practical for other operations including, but not limited to, fertilization and the like.

Figure 2:
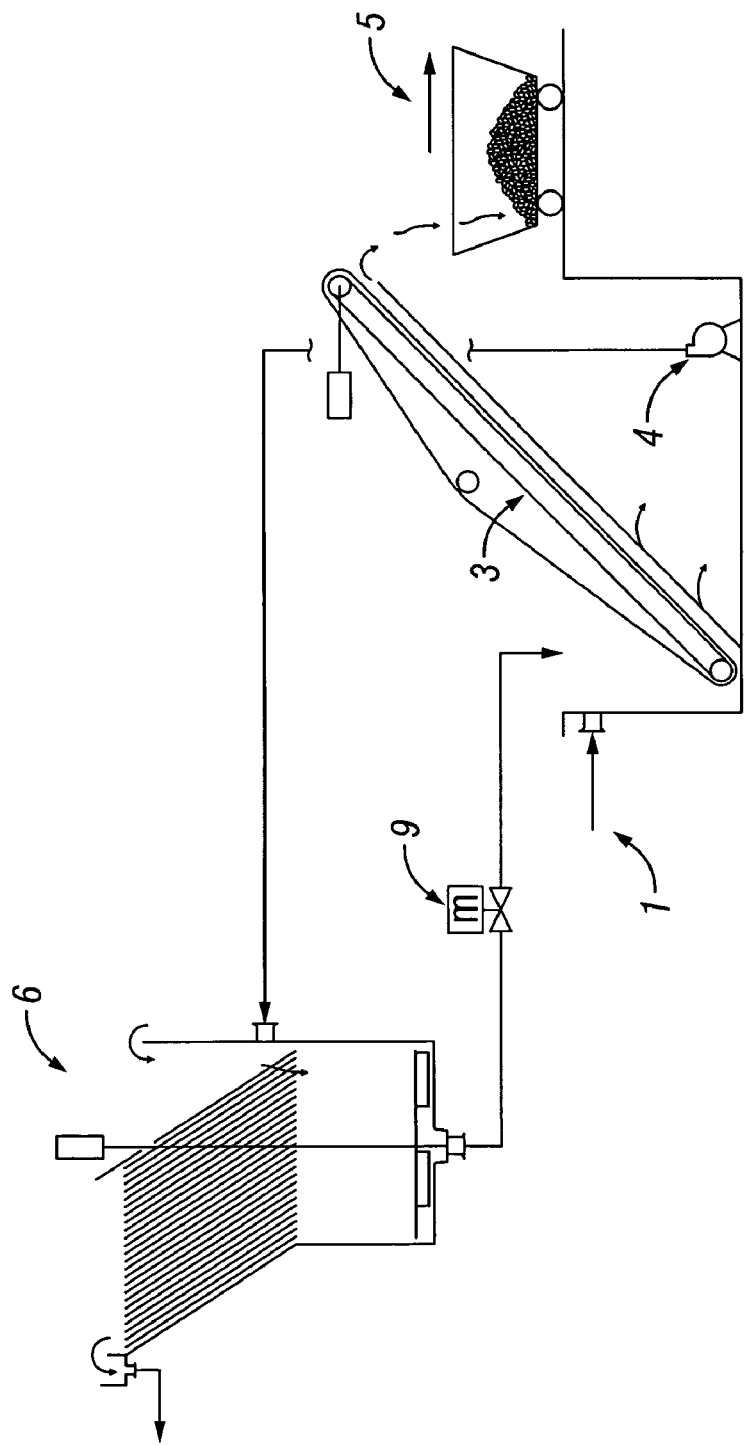
FIG. 2 is an illustration of an alternate embodiment of the present invention.

Now referring to FIG. 2, an alternate embodiment of the present invention is disclosed. Clarifier 6 is illustrated as an inclined plane clarifier. The inclined plane clarifier acts as a settling tank to separate additional solid material from the wastewater. Such devices are known in the art. An inclined plane clarifier better maximizes setting area and minimizes the required floor space. However, screening may be avoided altogether, and the solids portion can instead be concentrated in a clarifier, as discussed below.

Figure 3:
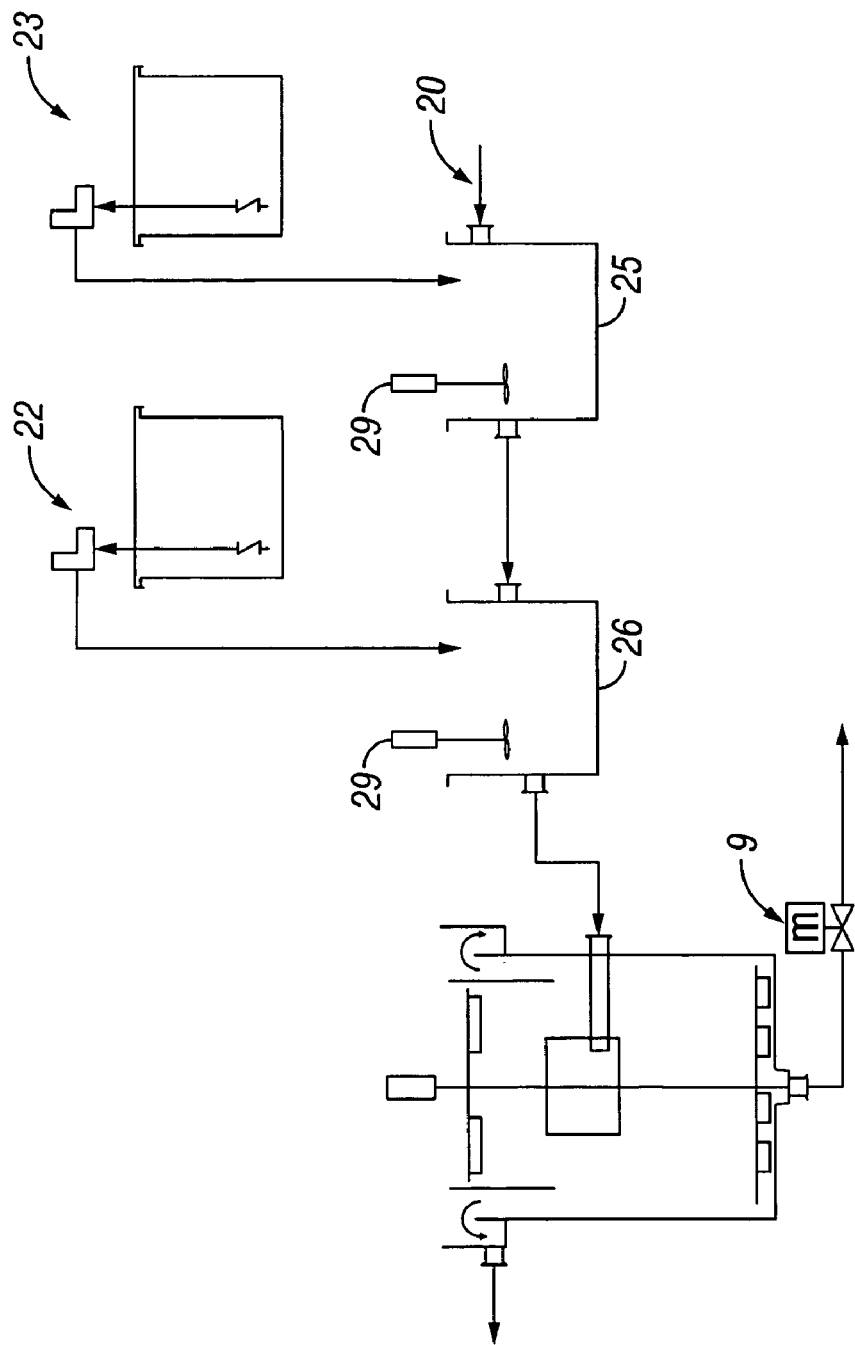
FIG. 3 is an illustration of an alternate embodiment of the present invention.

Now referring to FIG. 3, an alternate embodiment of the present invention, embodiments including chemical treatments of the wastewater are disclosed. Wastewater treated by various embodiments of the present invention may incorporate the addition of chemicals to aid in colloidal separation of the solids and dissolved solids, precipitation of dissolved solids, reduction of odor, conditioning, adjusting the pH, adjusting the electrolyte content, and the like of the wastewater. Various embodiments utilizing further chemical treatments may convey the wastewater along a path 20 into a tank 25. Tank 25 may include a mixer 29 or other device common in the art for circulating the wastewater. A treatment chemical may be added to tank 25 from a treatment chemical supply 23 or any other suitable source. Treatment chemical supply 23 may contain or comprise any chemical common in the art for treating wastewater, such as inorganic and organic conditioning agents and/or flocculating agents. Examples of such chemicals are common in the art and include, but are not limited to, aluminum chloride, ferric chloride, electrolytes, acids, bases, and the like. The use of such chemicals may improve the clarifier performance but are not required.

Various other embodiments of the present invention may utilize multiple treatments of wastewater with multiple chemicals in multiple tanks, such as tank 26 and chemical(s) 22. However, such other treatments are not required, but may be found to increase the waste removal from the wastewater. Such further chemical treatments may be employed in an environmentally sound manner such that the production of harmful products and is reduced.

Figure 4:
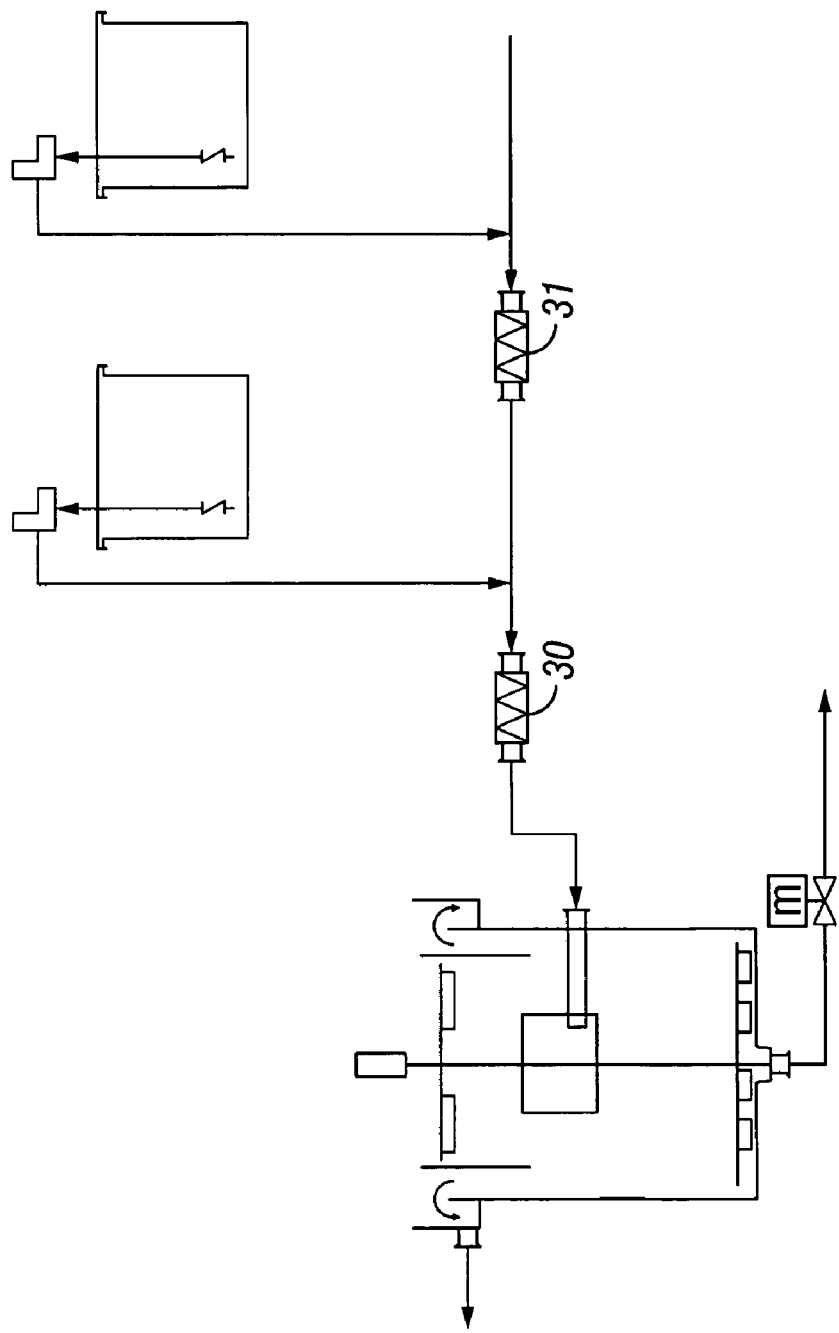
FIG. 4 is an illustration of an alternate embodiment of the present invention.

Now referring to FIG. 4, an illustration of an alternate embodiment, tanks for mixing of chemicals with the wastewater are not used. Mixing chamber 30 may be used to mix any utilized chemicals with the wastewater. Various embodiments may utilize any number of mixing chambers. In the illustrated embodiment, two mixing chambers 30 and 31 are connected in series. However, various other embodiments may utilize other combinations of mixing chambers in a variety of configurations including parallel and series configurations depending upon the application.

Figure 5:
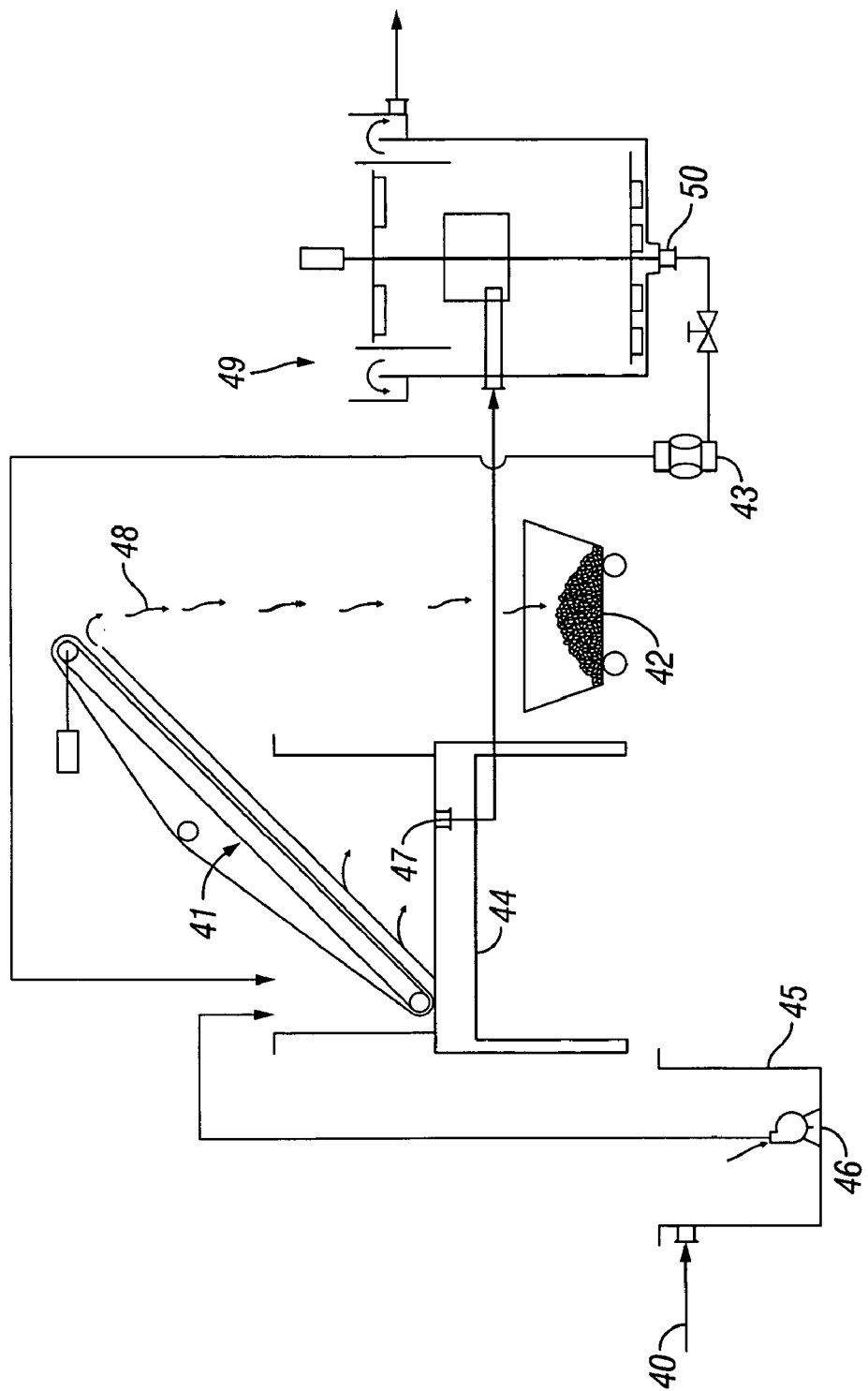
FIG. 5 is an illustration of an alternate embodiment of the present invention.

Now referring to FIG. 5, an alternate embodiment of the present invention, an embodiment is illustrated where the wastewater is pretreated before separation of the solids and dissolved solids. In an embodiment, wastewater is conveyed along a line or path 40 from a source, as heretofore described, into a tank 45. The wastewater may be treated for any desired effect or condition. In another embodiment, no pretreatment is performed and tank 45 may be a holding tank. After the wastewater is conveyed into tank 45 the wastewater is pumped by pump 46 or other similar methods or apparatuses into a tank 44. Tank 44 may have a separator screen device 41. As the wastewater is screened on separator screen device 41, a portion of the solid material in the wastewater will be conveyed along device 41 and conveyed to a trolley 42 for disposal or further use. The liquid and solid matter remaining in tank 44 may be passed at an opening 47 to a clarifier 49 where the wastewater will have further solid and dissolved solid matter removed. As described before, the sludge collected along a portion of tank 49 may be passed at a location 50. In embodiments of this design, after the sludge is passed from tank 49 it may be pumped back into tank 44 to be removed about device 41. Other embodiments of this type may convey the sludge elsewhere for any use or purpose.

Figure 6:
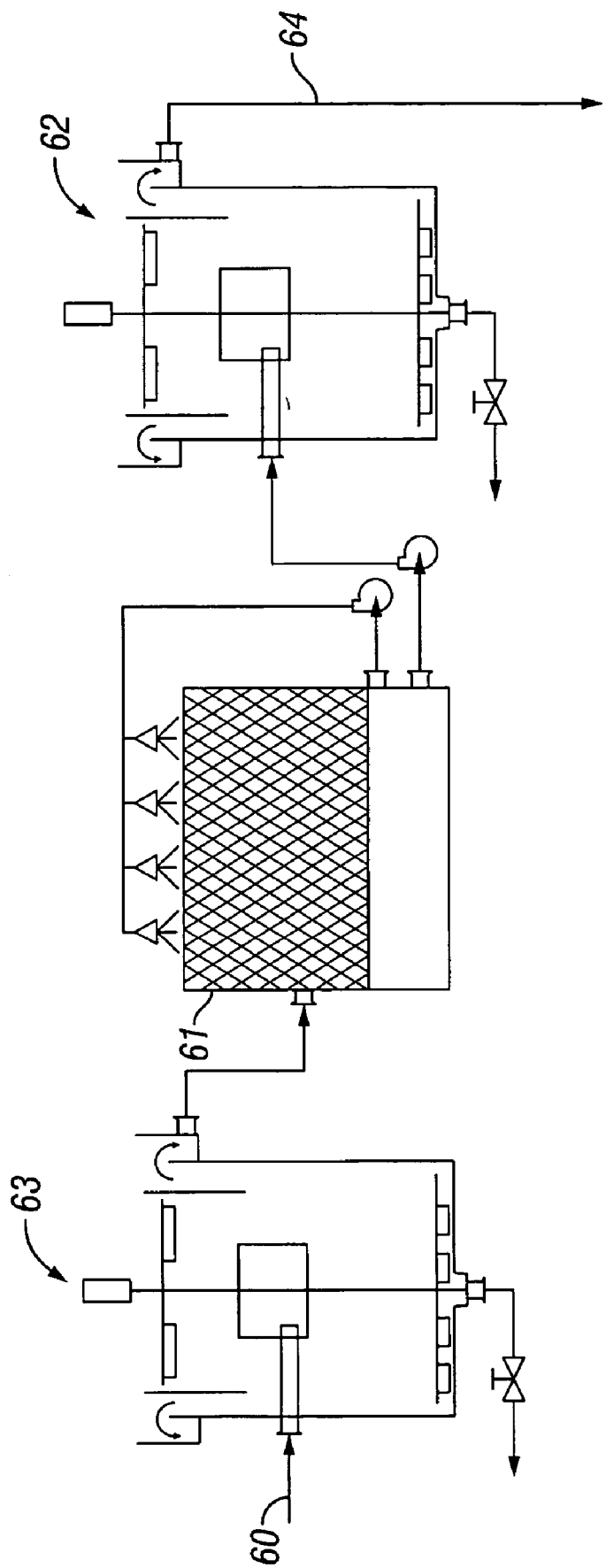
FIG. 6 is an illustration of an alternate embodiment of the present invention.

Now referring to FIG. 6, an alternate embodiment of the present invention, another embodiment of a clarifier system is disclosed. After the wastewater is screened, it may be conveyed along a path 60 to a clarifier 63. The clarified wastewater may then be passed into a bio-tower 61. For example, a Hoffland-Environmental Bio-tower. The bio-tower 61 acts as a trickling filter. Bio-tower 61 has a naturally occurring biomass culture adhering to walls within the tower. Convection of air about bio-tower 61 supports an aerobic culture and/or aerobic biological activity. As wastewater flows through the biomass, or media, a portion of soluble organic material in the wastewater is consumed. A second clarifier 62 may be used following bio-tower 61 for further clarification of wastewater. Other embodiments of this type utilize bio-tower 61 and clarifier 63 in alternate orders and in varying numbers.

Figure 7:
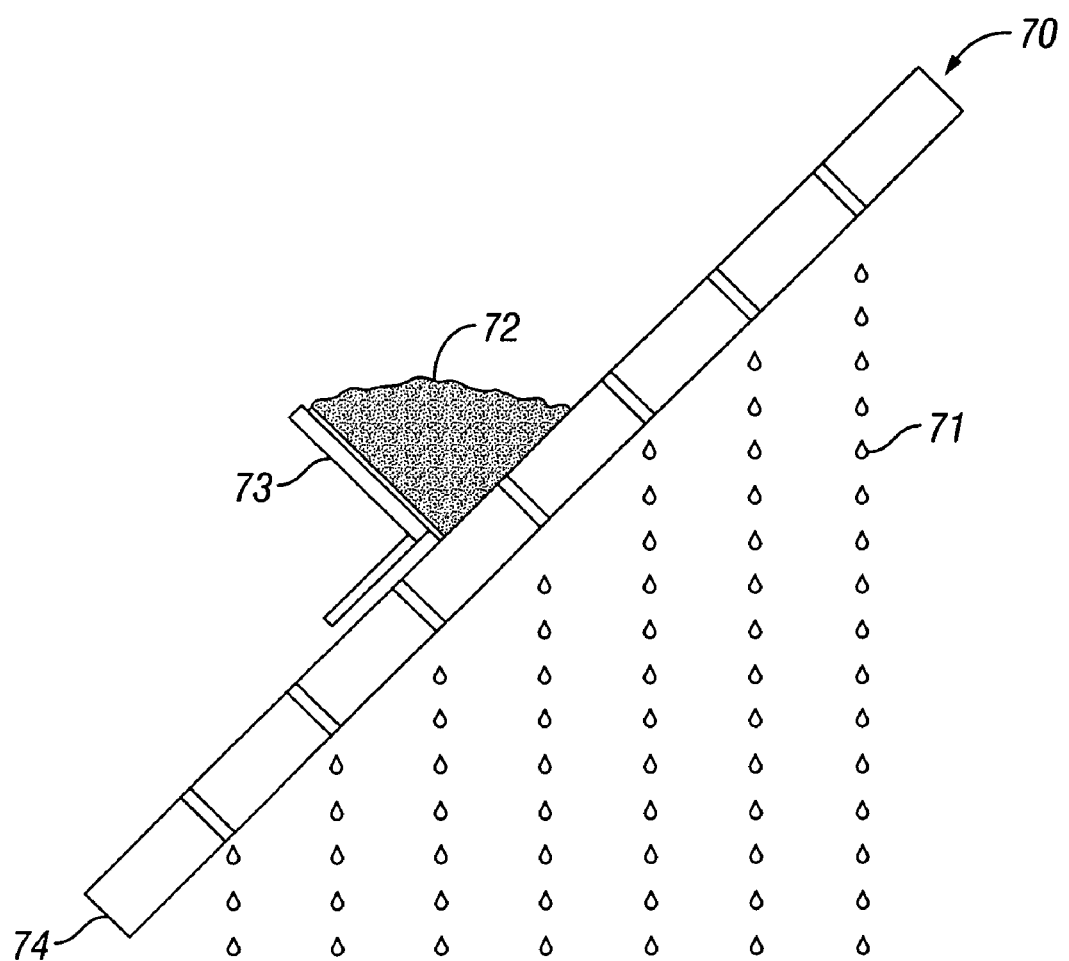
FIG. 7 is an illustration of a separator screen device of the present invention.

Now referring to FIG. 7, an alternate embodiment of a separator screen device is disclosed. Separator screen device 70 may generally be composed of a plane 74 and a drag chain 73. Waste solid particles 72 collected on a surface of plane 74 may be conveyed along plane 74 by a drag chain 73. A portion of a surface of plane 74 is porous such that liquid collected on a surface of plane 74 may pass through fall below. In an embodiment, a portion of the upper surface of plane 74 is porous. In another embodiment, the portion porous is the entire surface of plane 74. However, various other embodiments may utilize different structures to convey solid particles along plane 74 and will be readily apparent to those of ordinary skill in the art.

Figure 8:
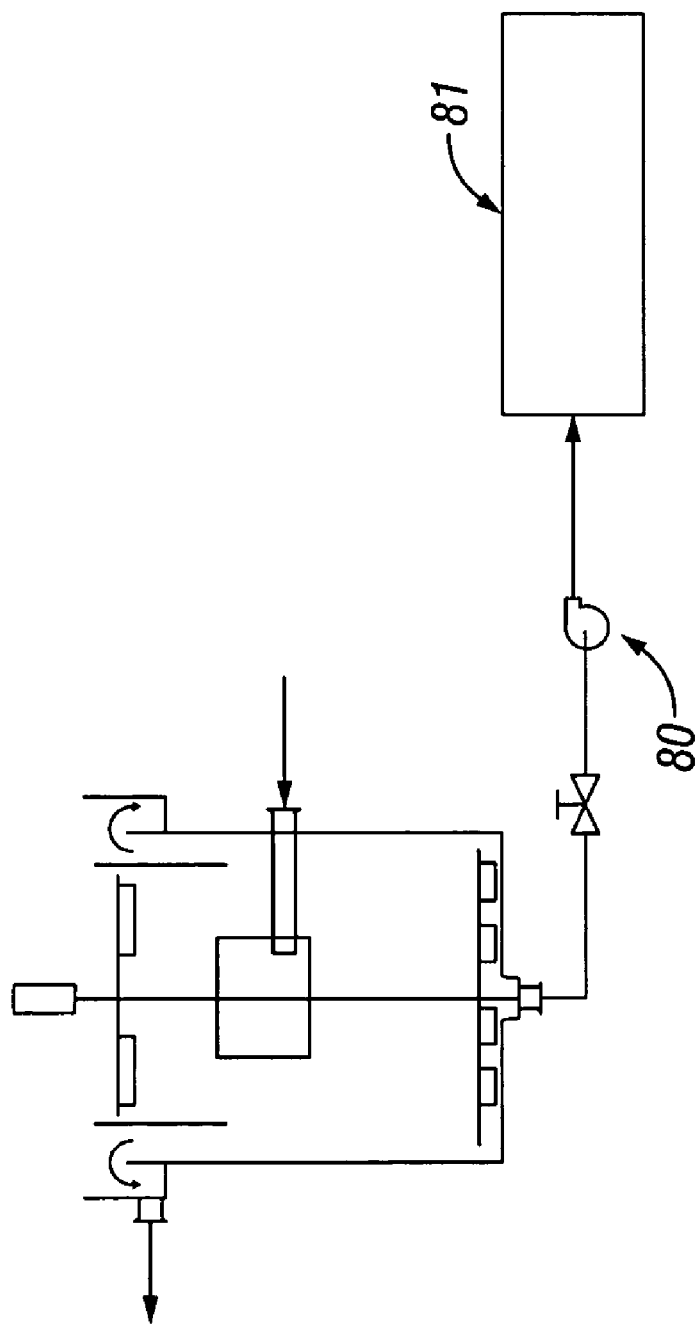
FIG. 8 is an illustration of an alternate embodiment of the present invention.

Now referring to FIG. 8, an alternate embodiment of the present invention is disclosed. Sludge collected from a portion of a clarifier may be conveyed and pumped by pump 80 into a solid compaction unit 81 for disposal or further use. Various other embodiments may compact the waste solids and sludge without the use of a pump.

Figure 9:
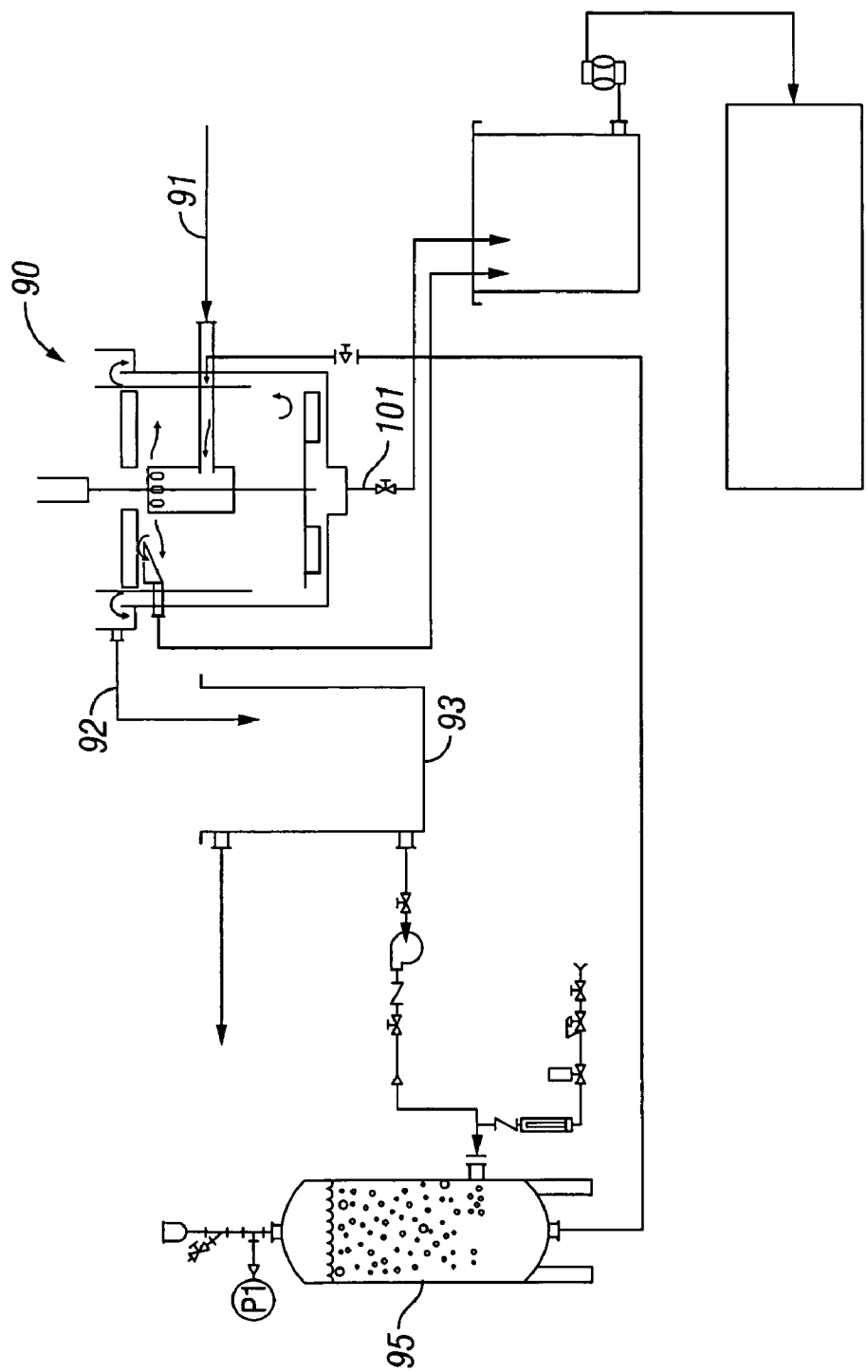
FIG. 9 is an illustration of an alternate embodiment of the present invention.

Now referring to FIG. 9, an alternate embodiment of the present invention is disclosed. FIG. 9 illustrates a gravity clarifier 90, tank 93, and dissolved air flotation system 95. In this embodiment, wastewater is conveyed through a port 91 into a gravity clarifier. A second solid material may be removed from about a portion of clarifier 90 at opening 101 and a portion of the wastewater will be conveyed along path 92 into tank 93. A portion of the wastewater conveyed into tank 93 will still have a portion of solids. The portion of solids in tank 93 is passed to a dissolved air flotation system for additional solid removal, while a portion of the wastewater in tank 93 will be conveyed to a lagoon or facultative pond. The wastewater in system 95 will be further separated, as is known in the art. Solid portions separated by system 95 may be conveyed to a trolley or disposed of in another manner. Liquid portions separated by system 95 may be conveyed back into a clarifier, screen, or facultative pond. However, various other arrangements and modifications incorporating the use of a dissolved air flotation system will readily apparent to those of ordinary skill in the art.

Figure 10:
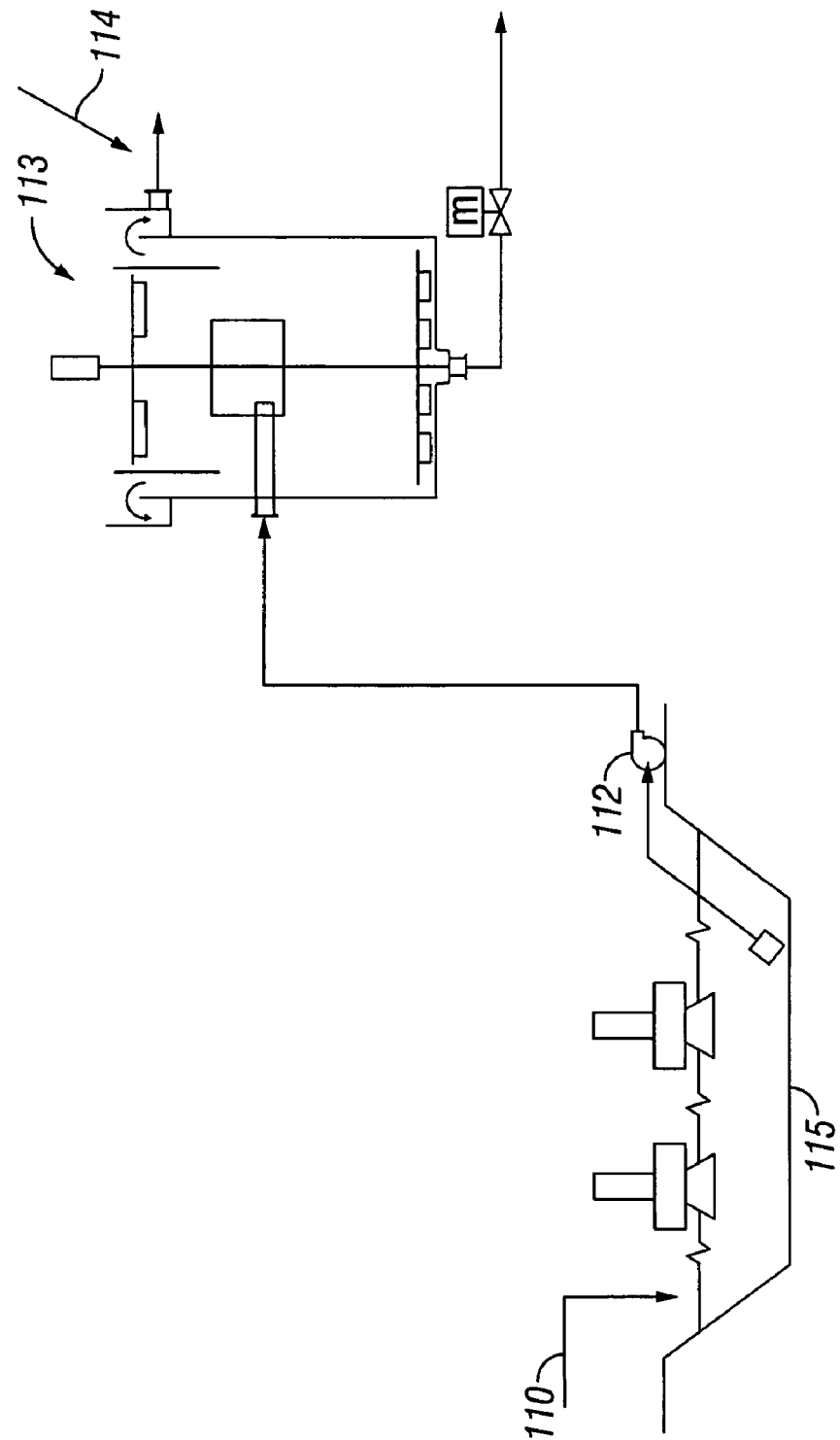
FIG. 10 is an illustration an embodiment of a denitrification system in use with embodiments of the present invention.

Now referring to FIG. 10, an embodiment of a de-nitrification system in use with embodiments of the present invention is disclosed. In addition to the various embodiments described above, wastewater may be further cleaned by de-nitrification. In an embodiment, wastewater from a clarifier or other treatment facility device and/or apparatus is conveyed along a path 110 to a tank 115. Tank 115 is equipped with at least one aeration system, constructed and fit in tank 115 as is common in the art. The aeration of tank 115 and wastewater will act to further decrease the amount of nitrogen present in the wastewater. The at least partially de-nitrified wastewater is then pumped, by pump 112 or similar device, to a clarifier 113. A clarified wastewater may be withdrawn about location 114 for further use or disposal.

Figure 11:
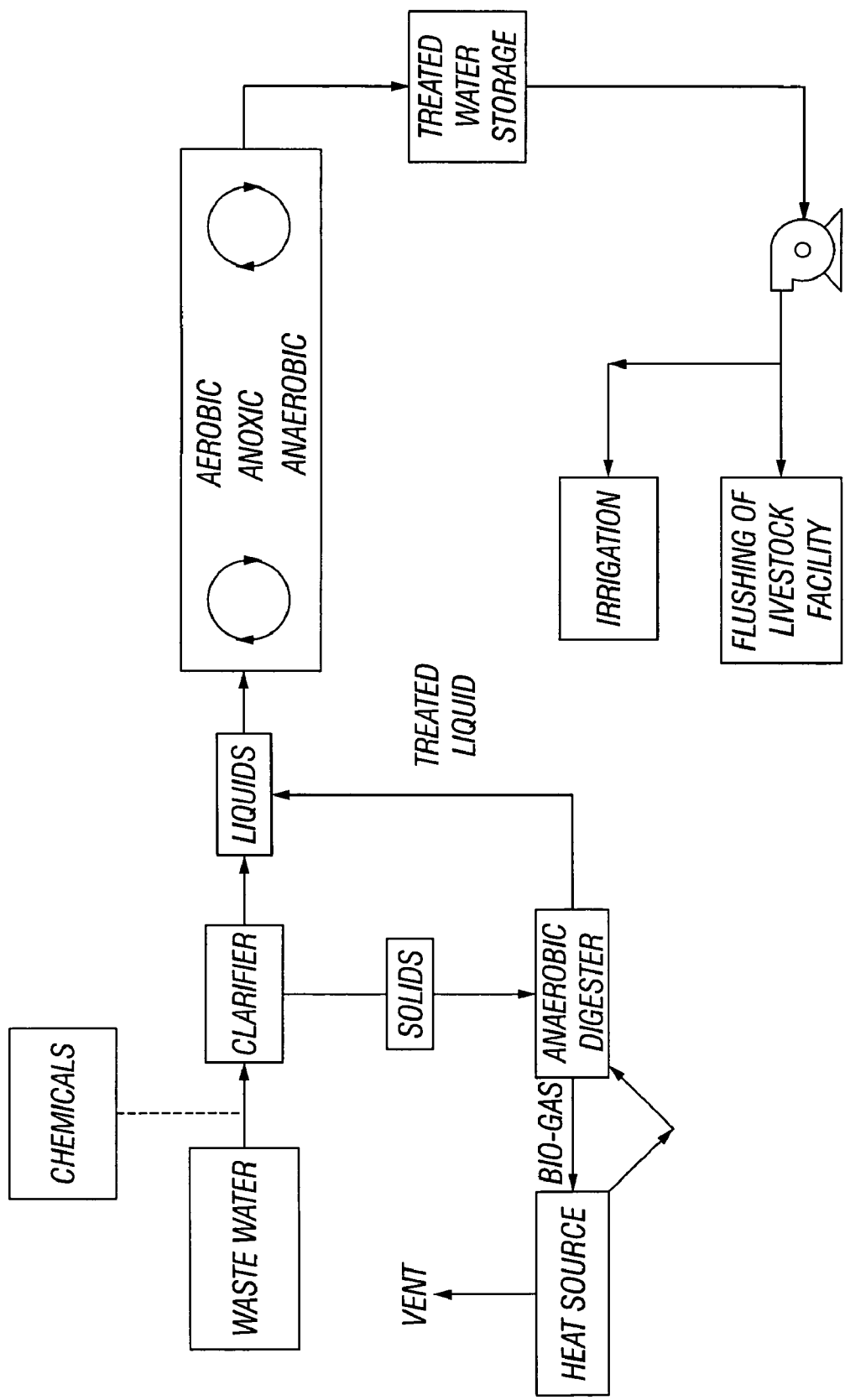
FIG. 11 is an illustration of an embodiment of the present invention.
Figure 15:
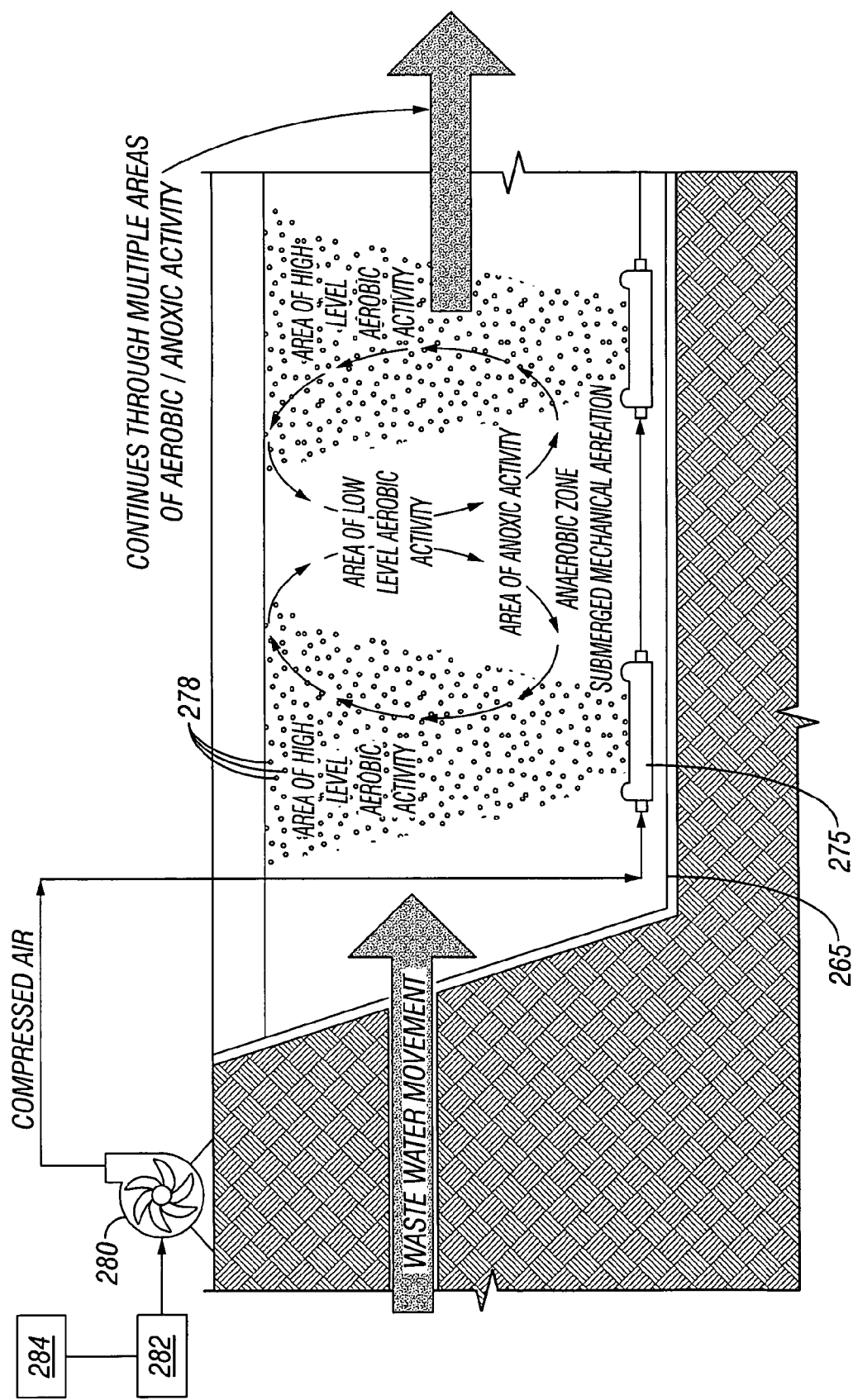
FIG. 15 is an illustration of an aspect of the present invention.
Figure 17:
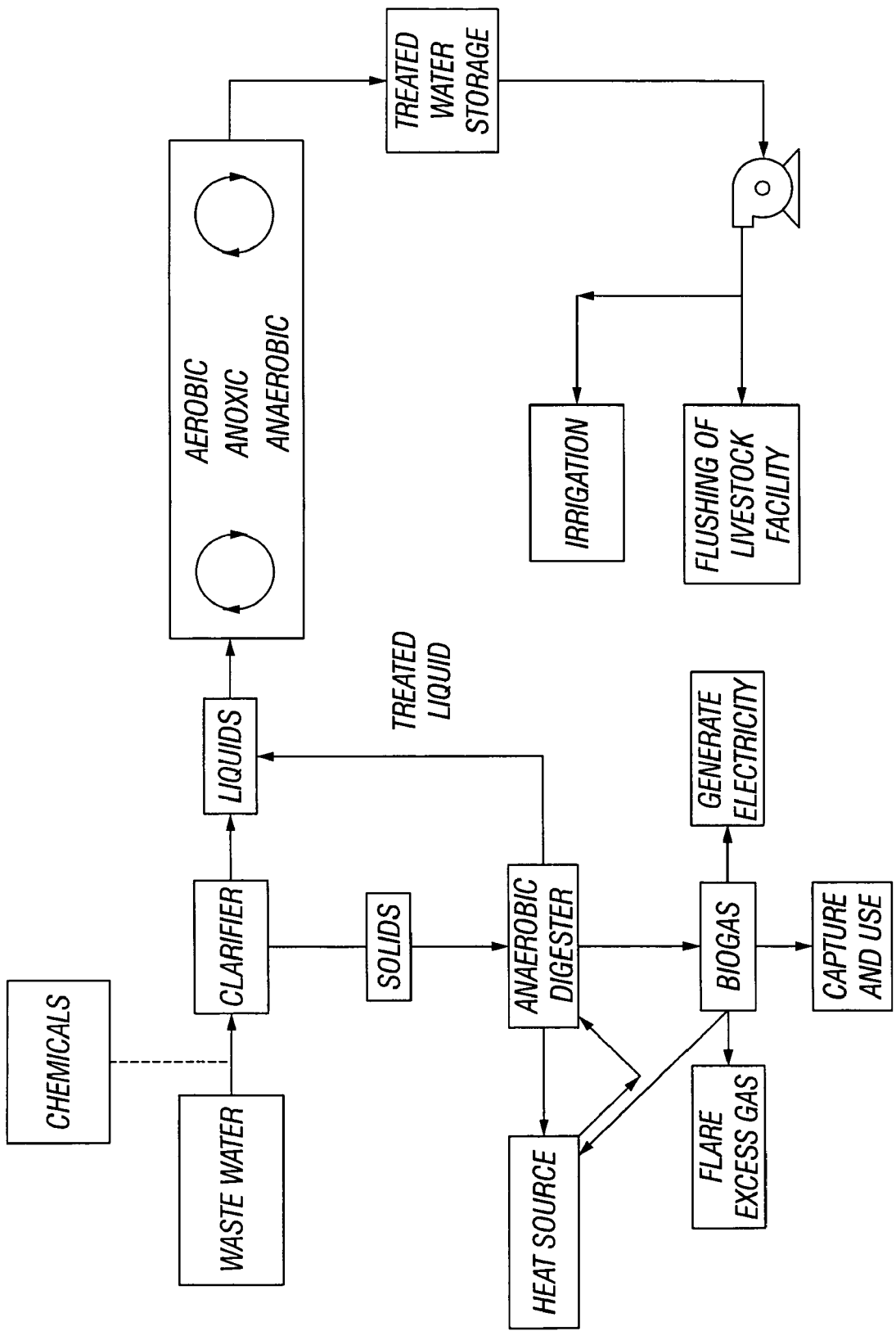
FIG. 17 is an illustration of an alternate embodiment of the present invention.
Figure 19:
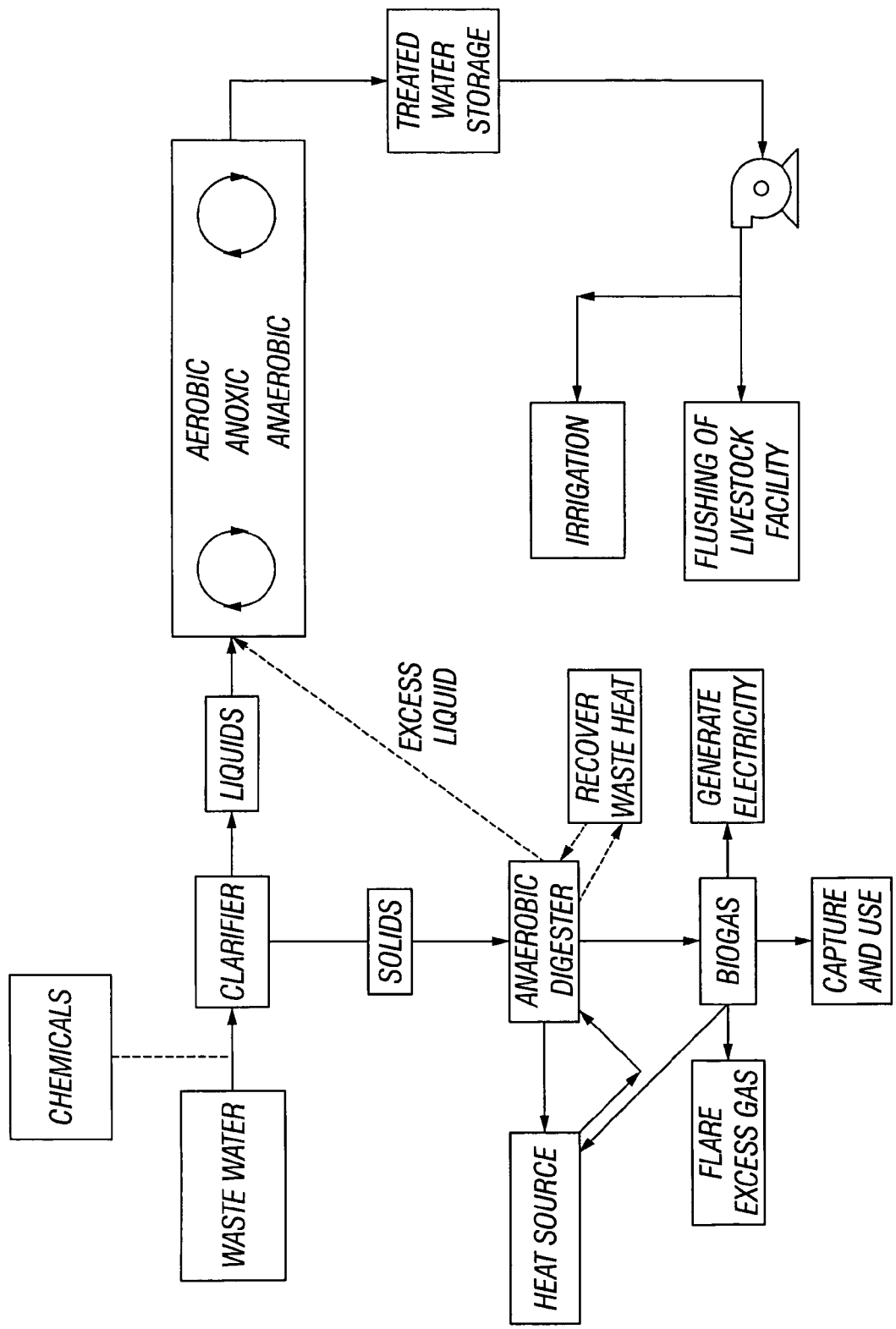
FIG. 19 is an illustration of an alternate embodiment of the present invention.

FIG. 11 is a flow chart that shows an overview of the method and apparatus of certain embodiments of the present invention. First, a source of wastewater containing biologic wastes, such as feces, nitrogenous waste and other organic and inorganic animal wastes are collected. Normally, the wastewater can be directly channeled into a clarifier that will separate the wastewater into a solids portion near the bottom of the clarifier and liquids portion near the top. The liquid portion is known as a clearwater portion and is comprised of at least nitrogenous waste, and possibly some biologic or carbon containing waste. The clearwater is then fed into a lagoon where it undergoes nitrification/de-nitrification and travels through various zones having different concentrations of oxygen. Different cultures thrive in different concentrations of oxygen and have different biologic action on the wastewater. Exogenous oxygen is preferably fed into the lagoon to make aerobic zones and the action of aeration will cause a convective flow around the oxygen source, such as that is shown in FIG. 15. As the distance away from the oxygen increases, zones will be of a lower oxygen content and will at some point turn into an anoxic zone, with a varying range of low oxygen content. Even further away from the oxygen containing zone will be an anaerobic zone, where there is virtually an absence of oxygen. Further, the convective flow will cause some mixing of the zones, so water will move from one zone to another. Once an appropriate level of nitrogen reduction and COD has been reached, the water can be removed for storage or for use, such as by irrigation and the flushing of a livestock facility, which also creates more wastewater. The solids portion (underflow from the clarifier) however is fed into an anaerobic digester that contains at least one culture of anaerobic bacteria. In the digester, the carbon content of the solids matter is greatly reduced. As a result, biogas is a metabolic by product and is comprised of at least methane, carbon dioxide, and hydrogen sulfide containing gases. In this invention, the biogas may either burned by a flare as it leaves the anaerobic digester to deodorize and detoxify the gas. Alternatively, a semi-permeable membrane may be used that allows for slow diffusion of the biogas through the membrane layer and subsequent oxidation and deodorization and neutralization of the biogas. However, more advantageously is to capture and use the biogas, for example to increase the temperature in the wastewater in the anaerobic digester that greatly increases the bacterial rate of reaction and metabolic processes. Additionally, extra biogas can be used to generate electricity and heat for a wide variety of uses. See e.g. FIGS. 17, 19, additional flowcharts. For example, FIG. 17 illustrates that the biogas can be burned as a flare, can be captured and used, can be used for a heat source for the anaerobic digester and/or to generate electricity. FIG. 19 illustrates that the biogas can be burned as a flare, can be captured and used, can be used for a heat source for the anaerobic digester and/or to generate electricity. Further, the waste heat from the generation of the electricity can be recovered and used to also head the anaerobic digester. Additionally, extra biogas can be compressed and stored. Residual heat or biogas could also be used to heat the hog house or other animal housing, such as in wintertime.

The present invention requires a wastewater source 1 that comprises animal feces with at least one organic carbon component at least a portion of which is an insoluble solid and a nitrogenous waste, and a clarifier 216. See FIGS. 11–19. The wastewater may come from any source. Examples of sources include, but are not limited to, livestock production facilities such as: cattle, swine, goat, sheep, horse and the like, chicken ranches, duck farms, geese farms, human waste, and the like. Clarifier 216 may be of any size dependent on several factors, including, but not limited to, the volume of wastewater treated, the available space, cost variations between the size of device, and the like. As shown in FIG. 11, chemicals such as coagulating agents may be added to the wastewater before the wastewater is fed into the clarifier.

If there is a large volume of wastes that exceed the size of the clarifier(s) such as in plug drain operations, various embodiments will use a storage tank or holding pit, or other suitable substitutes (not shown).

In the following embodiments, it is not necessary to use a screen because if the waste coming to the settling device, clarifier or anaerobic digester unless it has large trash or debris e.g. in excess of 1–2 cm (which may impair the operation of a pump). Instead, the flushed waste can go directly to the clarifier. If desired, the material coming off the bottom of the clarifier now can also be further compacted in any device such as an incline screen, a screw press, a filter press, a centrifuge or a bell press (not shown). These are devices common to the art.

Where the solids are decomposed with an anaerobic digester, e.g. 245, 246 in FIGS. 12–14, 16, 18 a clarifier 216 is used to concentrate the waste to feed to the anaerobic digester. If the wastes are collected and put into a clarifier first, the waste can be concentrated about 4–15 times and preferably at least about 10 times in terms of solids to liquids that comprise insoluble solids and undissolved soluble solids portions. Thus, there is about 6%–10% by weight concentration of material going in through it instead of about 1%. The limitation on the amount of solids concentration is that the solids portion still must be capable of flowing through the piping or conduits that lead to the anaerobic digester. This is significant because the size of the digester gets to be about 1/10 the size, or about the fractional equivalent of the concentration, and reduces the cost and the space requirements significantly with respect to the anaerobic digester. In contrast, if 100%, or substantially all of the waste is directed to the digester, it will require a very large system for commercial type operations that often requires about 6 months retention time, and acres and acres of storage.

When the wastes are separated and the solids are concentrated, the clear water portion 202a of the wastewater from the clarifier goes to the aerobic basin, and is further treated. Also after anaerobic digestion, the water from the covered anaerobic reactor goes to the aerobic basin and is further treated. Wastewater is conveyed to a clarifier 216 through an inlet in the clarifier 215, and an inlet still well 213. The clarifier has a top edge 220 and a bottom area 226. The clarifier 216 clarifies the wastewater to at least partially separate the wastewater into a clear water 202a portion at or near the top edge of the clarifier and wherein the solids are at least partially concentrated into a solids portion 202b at or near the bottom 228 of the clarifier. Clear water is defined as water that may or may not have discoloration, and has low turbidity, and does not have visible particulate matter. The primary clarifier 216 may have a sloped bottom to enhance solids removal and/or it may have a rake 218 that turns the material into the center to assist in the separation of the solids and the liquid wastewater 202. See FIGS. 12, 14. Typically near the top of the clarifier is a weir 222 to prevent any unseparated solids portion from overflowing the clarifier and from prematurely entering the oxidation lagoon As wastewater is treated in clarifier 216 a portion of the solids material may be removed from the wastewater such that wastewater may be further cleaned and the solid particles and dissolved particle content reduced. In an embodiment, clarified wastewater or clearwater portion is allowed to exit clarifier 216 about an opening 217. The clarified clear wastewater is preferably conveyed to a lagoon, holding pond, facultative pond, or other structure for further treatment. Various methods of collection and removal of clarified wastewater from clarifier 216 may be used and are well known in the art.

The clear water exits an outlet 224 near the top of the clarifier and then travels through a conduit to the aerobic basin 265 for nitrification and/or denitrification and/or a biological reduction of carbon. The conduit may be open or closed and comprised of a variety of materials known or used by one skilled in the art, such as a 6 inch schedule 40 PVC pipe.

At or near the bottom 228 of the clarifier is an outlet that channels the solids portion 202b into a solids conduit 234 that preferably has at least one bypass circuit 236 in the event the conduit becomes clogged. There may also be various valves 240 within the conduits to turn on and off the flow of the solids portion. The solids portion is then channeled to a anaerobic digester 245. Because much of the wastewater is separated and fed directly into the lagoon 265, the size of the anaerobic digester may be decreased from that typically used in wastewater treatment.

The clarifier can be a conventional clarifier manufactured by Hoffland Environmental Model No. 8/3000 the clarified water flows into the aerobic basin into the aerobic basin and the underflow that contains the solid slurry exits the clarifier at or near the bottom end through a valve. A variety of types of valves known to one skilled in the art may be used, such as a motorized ball valve manufactured by Hayward. The solids then flow into the covered anaerobic digester. The bottom outlet of the clarifier is ideally attached to a about 4 inch to about a 12 inch pipe, and preferably a 6 inch pipe which is the most economical pipe to use that will resist clogging.

Conduits, pipes, trenches, and the like connect the various components of the apparatus of this invention. The type of connection and conduits depend upon a variety of factors, for example, the need to prevent the escape of biogas, odors, and the desire to prevent the loss of heat.

Waste from cattle is different from that of hogs and is treated differently. The hay that is ingested is a cellulose material is chewed up so finely that it becomes like a paper waste. Cow waste is very dilute, and contains a lot of water. So if the wastes are flushed, as they do on the farms in the eastern part of the U.S., a very dilute solution of the dairy waste is obtained. If clarification is used, it takes it a very large settling tank, and even after it is settled and concentrated, the wastes are very dilute—only about 6%. So, it is more efficient to put the wastes directly into an anaerobic digester. Further, it is more efficient to scrape the wastes, such as by a tractor, and to pump the wastes into the anaerobic digester and it is already concentrated.

The anaerobic digester 245 reduces the volume of organic mass because the organic material in the solids is decomposed by bacterial action, so essentially up to about 90% of the carbon containing material will be biologically consumed by the microbe growth. As a result, biogas is produced which is about 60% methane and about 40% carbon dioxide and trace amounts of other gases such as hydrogen sulfide. Still, some undesirable septic odors can come off from the digested liquid from the anaerobic digester that has overflowed into the aerobic basin. The digester contains at least one anaerobic cultures of obliquely anaerobic organisms, wherein the culture reduces the organic content of the solids portion and produces a biogas comprised of methane and/or carbon dioxide and/or hydrogen sulfide. An anaerobic digester is capable of reducing the carbon matter, and removing or degrading the solids. Treated liquid 249 from the anaerobic digester flows into the aerobic digester as new waste is put in the anaerobic digester, periodically or continually, and there is a certain amount of overflow.

The anaerobic digester is most preferably covered because methane gas, or biogas is produced and comes off the digester. If the anaerobic digester is not an enclosed vessel such as a tank, the surface of the anaerobic digester can be covered. The type of material chosen for the cover depends upon whether capture of the biogas is desired. If so, a non-permeable type continuous cover should be used. Alternatively, a semi-permeable membrane may be used which allows the biogas 260 and water vapor 262 to come up through the membrane and to be vented. The cover will float as it has styrofoam floats 254 underneath it. If the digester is in a pit or reservoir it typically has a lining 247 that prevents leakage and escape of the water portion of the solids. Again, as a by-product of microbial degradation, hydrogen sulfide normally comes up through permeable or semi-permeable covers.

Figure 12:
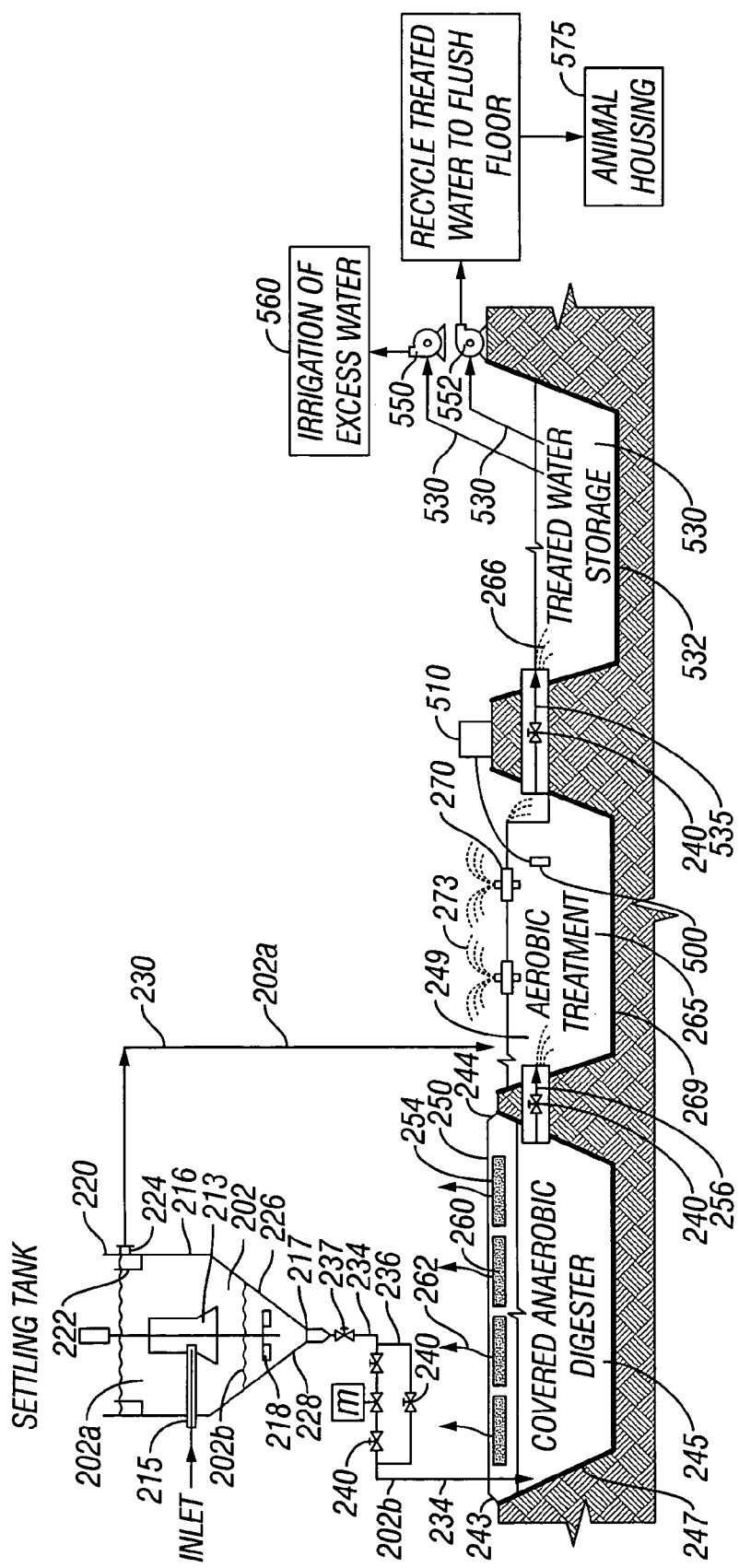
FIG. 12 is an illustration of an embodiment of the present invention.

If a semi-permeable membrane is used as in FIG. 12, it is preferable to use one that allows for slow diffusion of gases, and/or one that has specifically cultured bacteria that assist in the degradation of the biogas and oxidation of the biogas. The semi-permeable cover may be comprised of woven material, spun fibers, melted and blown films that are semi-permeable, and a variety of such materials known to one skilled in the art. Ideally, it is also ultraviolet resistant, and is preferably comprised of synthetic polymer material, such as polyethylene, polypropylene any type of ultraviolet resistant non-biodegradable material. The fibers will preferably be coarse fiber. The membrane may be of various thickness depending upon a variety of factors and may be less than $\frac{1}{16}$ of an inch and up to about $\frac{1}{4}$ of an inch or more.

One such cover is about $\frac{1}{16}$ inch polyethylene that is woven material, such as that made by Polyflex out of Grand Prairie, Tex. The preferred semi-permeable cover also includes cultures of the Thiobacillus genus to provide a strong oxidizing system on the floating cover. Further, the semi-permeable covering retains the gases so that they come out slow and in the aerobic conditions through the membrane and above the membrane, which at least partially oxidizes and deodorizes the hydrogen sulfide before it is released into the atmosphere. Biodegradation of noxious sulfur containing gas such as hydrogen sulfide is accomplished with autotrophic microbes of the Thiobacillus genus, which readily oxidize sulfide to sulfate.

Figure 13:
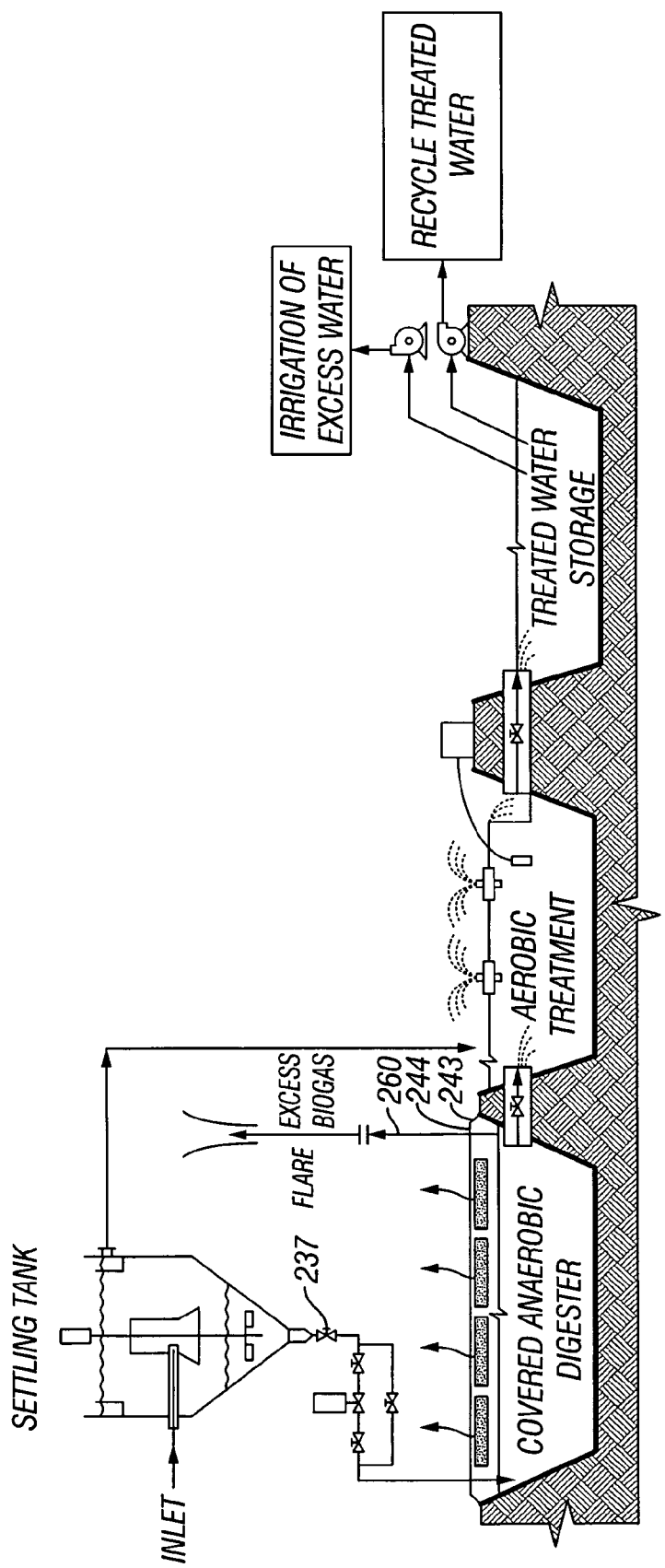
FIG. 13 is an illustration of an alternate embodiment of the present invention.

FIG. 13 shows an alternative embodiment of the method and apparatus of the invention. In FIG. 13, the covered anaerobic digester, a nonpermeable membrane cover is preferably placed around the top 244 and sides 243 of the reservoir, so that there is no unwanted escape of biogas from the digester. The biogas that is being produced will be burned via a constant or nearly constant flare to eliminate any of the odors rather than use it for recovering the heat. Biogas will burn in its produced form, but may also be separated and/or purified. Also, in another type of covered anaerobic digester such as a tank, a flare can also be used to burn the excess biogas. Further, when gas is produced, the membrane will be raised or lifted and will allow for collection and removal of the gas (not shown). It may be advantageous to have a permanently raised area, such as supported by a frame in order for the gas collection outlet to stay out of the wastewater (not shown). A variety of methods and apparatus can be used to collect the gas. A low pressure check valve or other type of valve, which may be manually or automatically operated, can be used. A low-pressure vacuum line may be attached and the collected gas is ideally compressed for storage or use. The degree of compression will vary upon storage capabilities.

Prior to storage, and it is preferable to purify the gas to remove the sulfides and other odiferous gases. The biogas could be purified by any means known and used by one skilled in the art such as by using an air separation unit, or separating gas comprising methane from the biogas by using a semi-permeable membrane. Molecular sieves can also be used to increase the concentration of the methane once it is purified it can be put in a pipeline or storage vessel The biogas is a low BTU value of gas, it is not as good as methane because it is 40% carbon dioxide, but it will still burn and can be used as a heat an energy source. Other methods and apparatuses for collecting and storing gases, as well as separating the gases that are known to one skilled in the art may also be used.

FIG. 17, shows the use an above grade tank for a covered anaerobic digester basin. An above grade tank will function as well as a below grade covered basin same process.

The covered anaerobic digester will usually have a 100 days retention time, if it is a mesophilic digester, it may be anywhere from five days to 100 days retention, if it is an ambient it will be about 4 months to 6 months to a year retention. The optimal temperature range for mesophilic digesters, and mesophelic bacteria are temperatures about 80° F. to about 100° F., with 95° F./35° C. being most optimum. Below about 95° F., the action of the digester is slower.

Figure 18:
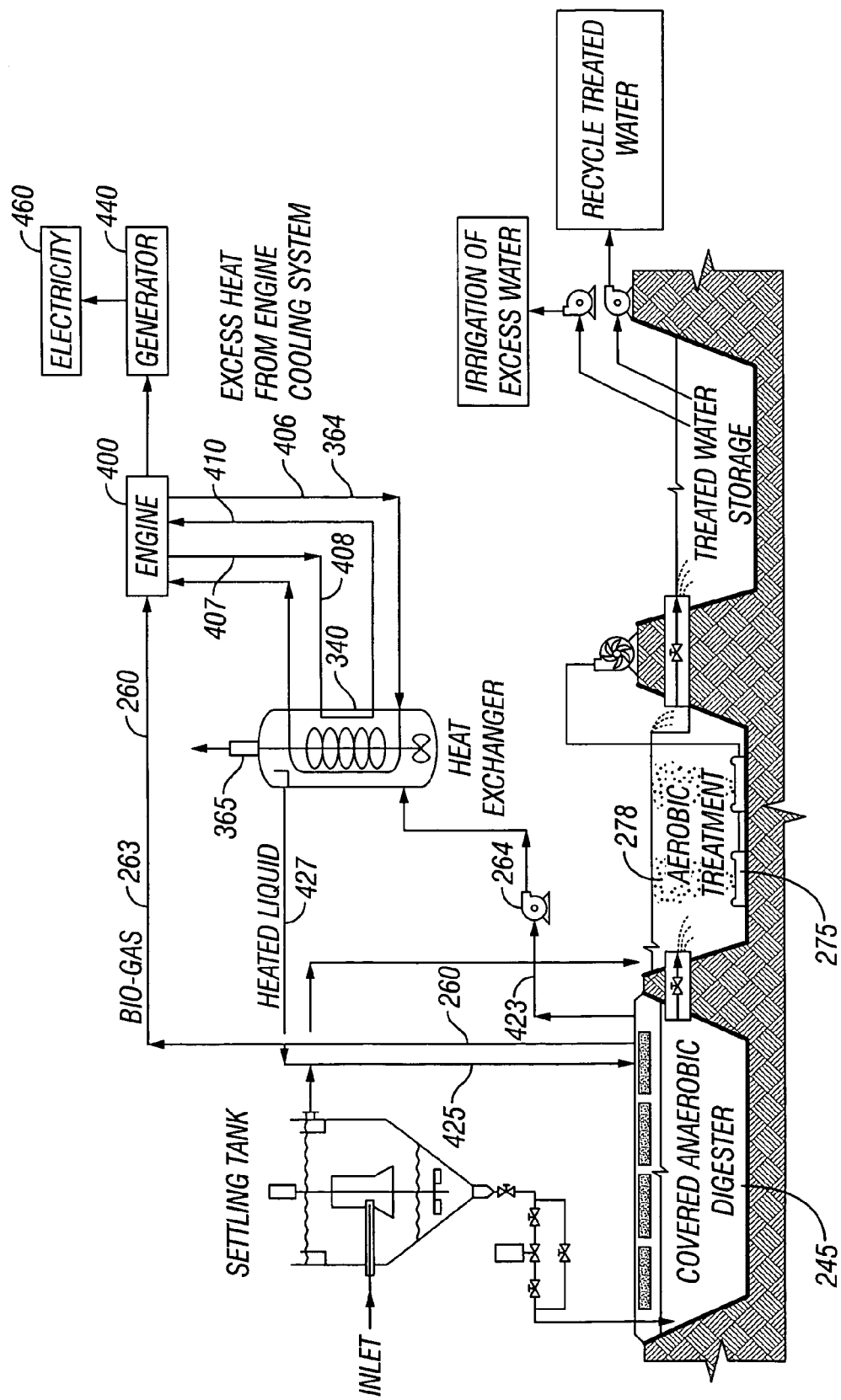
FIG. 18 is an illustration of an alternate embodiment of the present invention.

The anaerobic digester in FIG. 18 incorporates the use of an engine driving an electric generator to utilize the biogas producing electricity. The biogas is collected under a non-permeable membrane, which may be constructed of about 0.040 inch to about 0.060 inch high density ultraviolet resistant polyethylene manufactured by Polyflex. The biogas is sent through the engine in piping and that may be comprised of a variety of materials and sizes known or used by one skilled in the art. In an embodiment, aluminum, stainless steel, or plastic 6 inch pipes are used.

The gas is pressurized with a low-pressure blower such as Fujic Model VFC 200 p-51 to supply the biogas to the engine. For a swine operation with 1000 sows, farrow to finish a typical installation would include a 130 KW generator using a Caterpillar Model G-3406 HCNA engine with an induction generator. The unit will be equipped with a heat exchanger to receive the engine cooling water. The heat exchanger may be either a shell and tube style heat exchanger or a plate-to-plate heat exchanger such as Alp Laval model M6-MF6. The wastes from the anaerobic digester will be pumped through the cooling side of the heat exchanger. The engine exhaust may also be captured using a gas to liquid heat exchanger. The exhaust gas will be on the gas side of the exchanger and the anaerobic digester liquid will be pumped through the liquid side of the exchanger. The exhaust and/or excess heat are vented 365 from the exchanger into the atmosphere.

The heated wastewater 425 exciting the heat exchanger 340 is preferably conveyed back to the anaerobic digester through pipes 427 that are insulated, and that may be comprised of a variety of materials and sizes known or used by one skilled in the art. In an embodiment, carbon steel or stainless steel 6 inch pipes are used.

Figure 14:
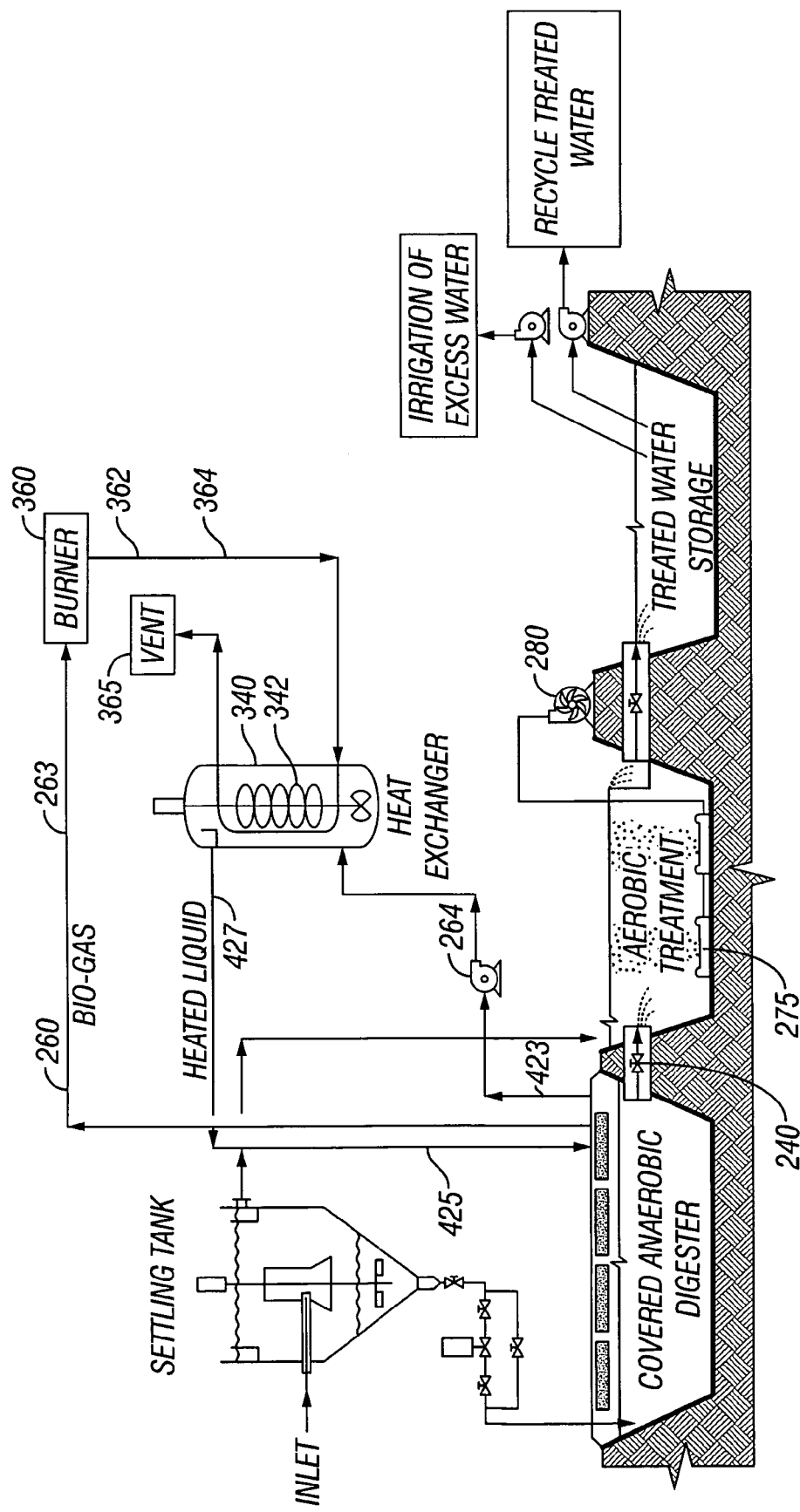
FIG. 14 is an illustration of an alternate embodiment of the present invention.
Figure 16:
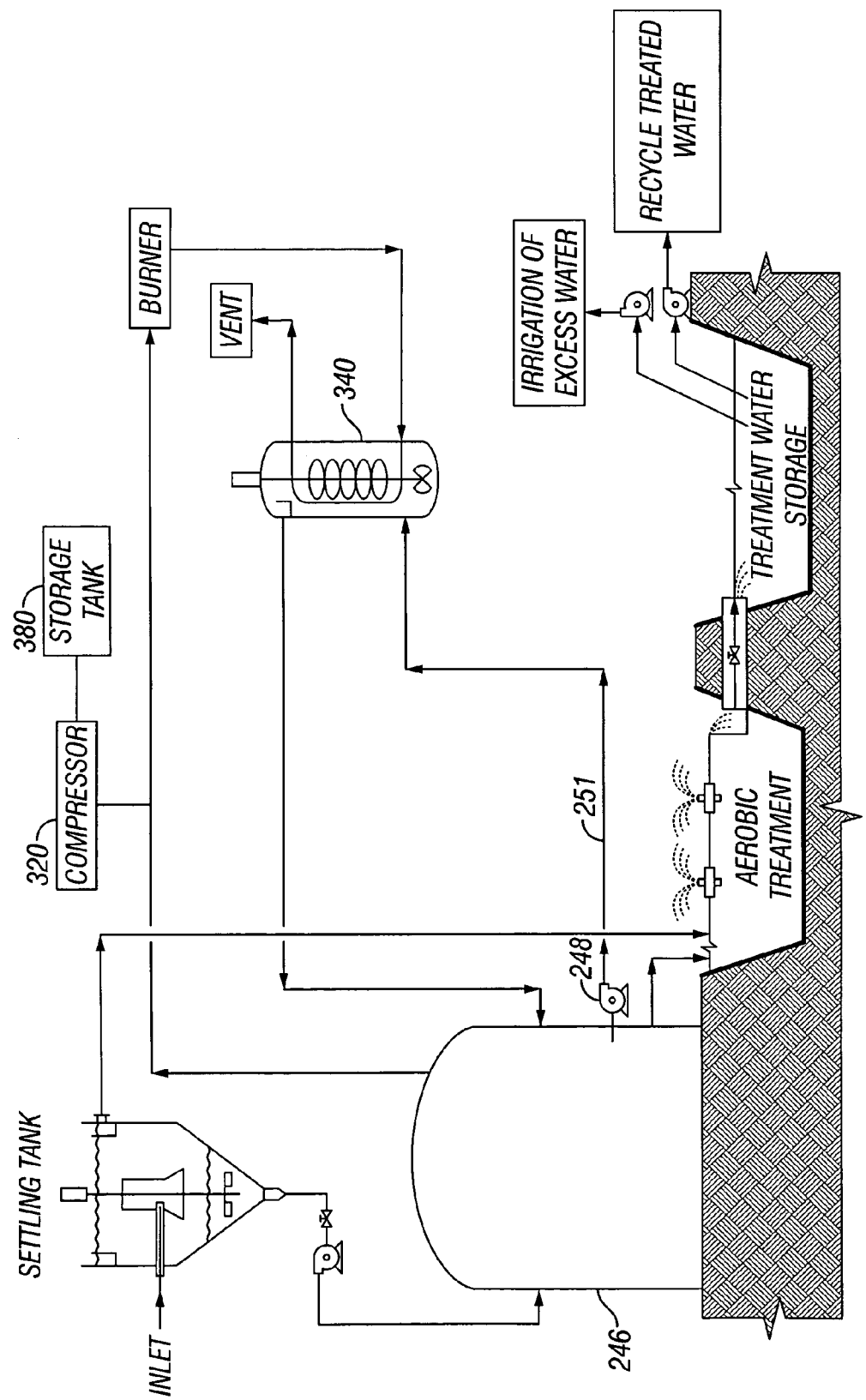
FIG. 16 is an illustration an alternate embodiment of the present invention.

The anaerobic digester of FIG. 14 is covered by a non-permeable membrane that allows for the capture of biogas that is then fed into a burner. The anaerobic digester of FIG. 16 is covered by a non-permeable membrane that allows for the capture of biogas that is then fed into a burner. FIG. 16 depicts a further embodiment of the apparatus and method of the invention. The covered anaerobic digester, comprises an above grade tank 246. The produced biogas is captured such as by a valve and a plastic or stainless steel line and may be compressed by a low-pressure compressor, such as 320, and then stored in a low-pressure tank 380. As shown in FIGS. 14, 16, and 17, at least a portion of the biogas will be fed to a burner where it is burned to produce and heat that is directed to a heat exchanger tank filled with water from an outlet line 251 from the anaerobic digester. The water is heated in the tank and then returned through a conduit back to the anaerobic digester. A low-pressure pump 248, is preferably used to fill the tank with the coil. The heated exhaust is vented into the atmosphere.

The burner 360 may be manufactured by ST Johnson, San Francisco, Calif. In FIG. 14, the gases may go through the serpentine coil and be vented or with the burner may be used to fuel a closed system, like that of a boiler heating steam or hot water and the hot water may be re-circulated through a heat exchanger, which will be supplied with wastewater from the anaerobic digester. The biogas is sent to the burner in piping 263 and that may be comprised of a variety of materials and sizes known or used by one skilled in the art. In an embodiment, aluminum, stainless steel, or plastic 6 inch pipes are used.

In this embodiment, the heat and/or hot gases 362 coming from the burner go through a conduit that may be comprised of a variety of materials and sizes known or used by one skilled in the art. In an embodiment, carbon steel or stainless steel 2 inch pipes 364 are used. The pipes lead to a serpentine coil 342 in a sealed tank 340 similar to the system manufactured by Hoffland Environmental model no. 8CL10, which has a mixer creating a high mixing rate inside the heat exchanger. The cooler wastewater 423 from the anaerobic digester is pumped through the sealed tank and the heated water 425 returns through an insulated pipe back to the covered anaerobic digester, and that may be comprised of a variety of materials and sizes known or used by one skilled in the art. In an embodiment, carbon steel or stainless steel 6 inch pipes are used. Optimally, the wastewater in the anaerobic digester is heated up to about 95° F. This is especially an advantageous process in the winter and spring months in the cold parts of the country as the anaerobic digester operates optimally around 95° F. It is also important not to overheat the water in the tank, as it is not the object to kill the mesophilic bacteria within the anaerobic digester. The pump 264 from the anaerobic digester is usually most efficient to be a submerged, such as manufactured by Zoeller, Model G295 and conduit system is used to convey the unheated liquid from the digester to the heat exchanger tank.

By raising the temperature of the digester, the rate of digestion increases considerably, even up to about 50 times or more, as opposed to ambient digesters which operate without any external heat source or elevation of temperature, besides solar energy.

Alternatively, the gas may be burned beneath a vessel that holds water that is being treated and the water may be directly heated and then introduced into the anaerobic digester. If the concentration of the waste going to the digester is large enough, a sufficient amount of gas will be produced which can be converted to electricity with the excess energy recovered by the heat exchanger and the system becomes self sustaining, and even extra energy may be produced.

In this invention, as shown in FIGS. 18–19, an engine 400 can be used to burn the biogas 260 to drive a generator 440 and produce electricity. The engine will take the biogas, burn the biogas in the engine 400 that drives the generator 440, the generator produces electricity 460, and the electricity is used for any purpose. Also, the engine and/or generator produce a heated exhaust and/or waste heat 406. The waste heat is channeled into a conduit 364 that may be comprised of a variety of materials and sizes known or used by one skilled in the art. In an embodiment, carbon steel or stainless steel 2 inch pipes 364 are used. The excess heat produced by the generator and/or engine is then used by a heat exchanger 340 which recovers the excess energy to the system, i.e., at least a portion of the engine waste heat and/or heated exhaust 406 can be used to raise the temperature of the water in the anaerobic digester in order to speed up the anaerobic digester. See FIGS. 18–19. The exhaust and/or excess heat are vented 365 from the exchanger. The power from the generator may also be used to run the aerators, e.g., 270, 275, and/or pumps e.g., 264 of this invention. A heated outlet wastewater line 427, and may be comprised of a variety of materials and sizes known or used by one skilled in the art. In an embodiment, carbon steel or stainless steel 6 inch pipes are used.

A conduit 407 from the engine which contains exhaust and/or waste heat 407, is connected to a heat exchanger 340 that is used to cool an engine 400 burning biogas and producing heat 406, such as a heated exhaust and an engine waste heat, and less heated water 423 from the anaerobic digester is pumped into a heat exchanger 340 and a cooling water 408 from the engine is passed through the heat exchanger, liberating the heat from the engine to the wastewater and returning to cool 410 the engine, and wherein a return line conveys the heated wastewater 425 to the anaerobic digester to raise the temperature of the water in the anaerobic digester 245. See e.g. FIG. 18.

As a further embodiment, it is possible to use the engine and generator of FIG. 18 with one heat exchanger, with the burner and heat exchanger of FIG. 16, which are separate allowing enhanced energy capture and heating of the anaerobic basin with two heat exchangers.

In embodiments illustrated in FIGS. 11–18, the anaerobic digester preferably reduces the amount of organic components in the wastewater to approximately about 100 mg/l to about 10,000 mg/l. The flow rate of the anaerobic digester will vary depending upon the concentration and types of waste, as well as the temperature of the wastewater in the digester.

Once the desired carbon content of the waste in the anaerobic tank is reached, wastewater will be channeled into the aerobic lagoon through a conduit 256 preferably also comprising at least one mechanical and/or automatic or automated valve 240 the conduit can be comprised of a variety of materials known or used by one skilled in the art such as stainless steel and PVC. Because PVC is less costly, it is preferable to use a 12 inch PVC pipe. The liquid that flows from the anaerobic basin to the aerobic basin may be pumped or it may be gravity flowed through a controlled valve and the aerobic basin. The lagoon/oxidation basin is typically a self-contained vessel, whether plastic, concrete, or clay covering raw earth.

The nitrogenous wastes are not removed by the clarifier or by the anaerobic digester, either one. In the anaerobic system, the bacteria consume some of the nitrogen as part of its growth cycle, but when it dies it releases it all, so it all comes back out in the form of ammonia. The nitrogen in the wastewater must go through this denitrification process. This process is described for example in U.S. Pat. No. 6,054,044 to Hoffland. However, since that time, an alternative method has been discovered that does not require recirculation and baffles. Rather, the recirculation can take place convectively in the basin itself. Therein the nitrogen will be removed and reduced significantly by creating three levels of microbial growth within zones of the aerobic basin or lagoon. In the aerobic basin or lagoon, there are alternating zones of highly anaerobic high levels of exogenous oxygen and levels where there is no exogenous oxygen, where the nitrate is consumed and as it moves through the pond these re-circulation within the zone is set up without the addition of mechanical recirculation, such as by a pump. In the aerobic basin, the water is aerated by any type of aeration device to increase the exogenous oxygen content. There may be floating aerators as shown in FIGS. 12, 13, and 16, or there may be submerged aeration as shown in FIGS. 14 and 18. Aeration equipment provides sufficient dissolved oxygen to maintain an aerobic culture and to create a convective flow around the aerator(s).

Surface aerators shown in FIGS. 12, 13, and 16 that move water and atmospheric air into the lagoon in a sprinkler like fashion, which causes the water to mix around the aerators. Submerged aerators are typically operated via a pump or blower 280, e.g. FIG. 14. Additionally, a submerged perforated tube can be used to oxygenate the lagoon. The tubes may be laid in any sort of pattern or design and maybe parallel to each other or criss-cross. Preferably, a weighted tube is used so that the aeration does not cause the tube to rise within the lagoon. Also, preferably the tube may be disconnected so that if it becomes clogged, it can be replaced or repaired. Convective flow will occur between the pipes in the lagoon, like the convective flow shown in FIG. 15.

There is a highly aerobic zone where the bacteria forms a nitrosomos. Bacteria, which lives off the ammonia and forms nitrite, and then under aerobic conditions the nitrite, is oxidized to nitrate. The nitrate is still in the solution, containing soluble nitrogen that remains an excess nutrient with movement of the liquid around and through the zone, the ambient condition changes from aerobic to anoxic to anaerobic. Anoxic can be defined as the absence of oxygen, however in the wastewater industry anoxic may also be referred is just becoming anaerobic. When termed anaerobic, it is considered deeply anaerobic, after most of the oxygen containing compounds are removed. Under anoxic conditions, there is no free exogenous oxygen. Certain facultative bacteria can live under aerobic conditions and under slightly anoxic conditions will continue their life cycle metabolizing the oxygen that is contained in the nitrate radical. They consume the oxygen in a nitrate radical for metabolism forming carbon dioxide. The nitrate is therefore reduced and is released as nitrogen gas. This is called denitrification. The oxygen in the nitrate forms carbon dioxide as the microbes metabolize the available carbon source. In the absence of nitrate the system becomes deeply anaerobic. Under anaerobic conditions, the microbes use sulfate as an electron donor producing hydrogen sulfide. The solution convection moves the liquid back to the aerated zone where the Nitrosomonas bacteria that had become dormant now becomes active and begins metabolizing the ammonia. The nitrification of the ammonia forms nitrate and the cycle continues.

In the prior art, the accepted technique was to create a fully aerated aerobic treatment facility where sufficient aeration was provided to biologically consume essentially all of the carbonaceous material and then have sufficient aeration to nitrify the ammonia to nitrite and subsequently nitrate. Then the solution containing the nitrate was recycled either to the beginning of the process, which was maintained in an anoxic/anaerobic condition to denitrify the nitrate producing nitrogen gas. The nitrate was optionally transferred to a tertiary facility where additional carbon source was added to support the denitrification process. However, the embodiments of this invention teach that in the presence of excess carbonaceous material if the wastewater is cycled through highly aerobic zones followed by anoxic zones, the nitrification/denitrification is accomplished without the addition of further carbonaceous materials.

A culture of Nitrosomas bacteria is cultured to convert the ammonia ($NH_3$) to nitrite (NO). The problem with the conversion is that the Nitrosomas bacteria require a highly aerobic environment for it to live. This is usually stated as an oxygen concentration in excess of 1 mg/l. When a waste such as swine waste containing carbonaceous material as well as ammonia, is aerated, the microbial growth that consumes the carbonaceous matter will live well at oxygen level near zero. So, in most cases, sufficient oxygen must be provided to support the microbial growth to consume, essentially all of the carbonaceous matter before the microbes stop feeding and the oxygen content will increase to a level to support the Nitrosomas bacteria. So, the conventional technology consumes all of the organic matter, and then the oxygen concentration increases and the Nitrosomas bacteria metabolizes the ammonia.

The next reaction is with Nitrobacter, which under aerobic condition will convert the nitrite (NO) to nitrate ($NO_2$). The treated waste is now under aerobic conditions with all of the carbonaceous material consumed and an excess of nitrate. The nitrate is soluble, and remains in solution. Now, all of the nitrogen remains in the system, it has been biologically converted from ammonia to nitrate. The nitrate is an excess plant nutrient, and has essentially the same detrimental environmental effects as does ammonia.

To decompose the nitrate, the waste must be subject to anoxic or anaerobic conditions. When the nitrate is added to solution with active microbial growth and a food source but not an excess of oxygen, the facultative microbes will use the oxygen in the nitrate molecule to support their live cycle. The by-product is free nitrogen, a gas that is liberated. This is called "denitrification."

If highly aerobic conditions can be created in the presence of a food source, the Nitrosomas bacteria will flourish in the aerobic zone, then go dormant in the areas of low oxygen content. The nitrite and nitrate created in the highly aerobic zone become additional oxygen sources for the microbial growth in areas of low to near zero oxygen content. In essence, nitrification/denitrification can take place in the presence of high concentration of carbonaceous materials if highly aerobic zones and anoxic or anaerobic zones are created. The natural migration of the liquid through the treatment basin is sufficient to move the liquid through alternating zones of high aerobic area to support the growth of Nitrosomas microbes and anoxic zones for denitrification. Thus, mechanical recirculation is not required.

FIG. 15 shows an up close view of an example of submerged aeration. As shown in FIG. 15, in the area over the aeration device, the water is saturated with oxygen, preferably about 2–8 mg/l. The facultative microbial culture present lives very well, consuming the food present and multiplying. The highly aerobic zones also support the growth of the Nitrosomas bacteria. The entire area is fluid and the introduction of the air creates violent agitation. It also establishes a circulating movement around the aerator. The liquid is moving through the aeration basin in a plug flow manner, moving from the basin inlet to the basin discharge point. As it moves through the basin it passes through multiple aeration zones. Between the aerators and especially further away from the surface of the lagoon will be an area of anoxic water where anoxic cultures will thrive. Closer to the aerators and the surface of the lagoon will be an aerobic area where high concentrations of dissolved oxygen exist.

The induced circulating agitation around each area of oxygen introduction creates first a highly aerobic zone, followed by anoxic zones then anaerobic zones then returns to the aerobic zone. In the aerobic zone, with excess of oxygen, the nitrification and aerobic microbes flourish well. As the liquid moves from the highly aerobic zone to the anoxic zone, the Nitrosomas bacteria activity slows dramatically and the bacteria become dormant. The aerobic microbial growth continues to grow well as the oxygen content is depleted. In the absence of exogenous oxygen the liquid becomes anoxic. The facultative bacteria continue to grow using the oxygen within the nitrite and nitrate formed in the aerobic zone. When all nitrite and nitrate are consumed, the nitrogen is liberated and the zone becomes anaerobic. As the circulatory liquid movement moves near the bottom of the basin, the conditions become anaerobic. The facultative bacteria momentarily become inactive to dormant. As the liquid moves into the aerobic area, the facultative bacteria become active and the Nitrosomas also moves from the dormant state to the active state. The movement of liquid through the basin inherently moves the liquid waste through multiple zones of aerobic, anoxic and anaerobic activity.

There may also be an on/off switch 282 for exogenous oxygen, which may be manual or automatic. If it is automatic, it may also be programmed on such a time or other means known or used by one skilled in the art 284 for the desired on/off cycle and duration. The aerators may be run constantly, or can be selectively turned off in order to save energy. If the oxygen content comes up to high, then some of the units would be turned off to conserve energy, such as for about 10 minutes to even 10 hours or more. The aerators may be turned on or off in a staggered fashion such as where a zone had an undesired concentration of nutrients and/or cultures. Depending upon the temperature in the aerobic basin, concentration or nutrients, and the like, the aerators may be from 10% on to 95% on, 24 hours a day. The source of the exogenous oxygen will be atmospheric air since purified oxygen, is too expensive. The wastewater is oxygenated by bubbling the air bubbles 278 through it. Also, if a greater quantity of waste is coming in and the bacterial growth is so great that it is consuming all the oxygen that is available and then it goes anaerobic, more exogenous oxygen can be added by more aerators or more vigorous aeration. In summertime, the oxidative lagoon will work a lot faster without any exogenous heat, so it is likely that more vigorous aeration will be required in summer, and less in the winter. Depending on the type of aeration means, vigor of the aeration means, size of bubbles, temperature of lagoon, the aerations may be 5 inches to 10 feet apart, or even 10 feet to 100 feet apart as in the case of some surface aerators that may be 8 feet to 10 feet across.

In the lagoon, the pH can be monitored as well as the oxygen. If a pH adjustment is necessary, exogenous bases or acids that are inexpensive and known to one skilled in the art can be added. A probe 500 in the aerobic basin/lagoon can monitor oxygen through an analyzer 510 that is commercially available and known to one skilled in the art, or a sample can be taken out and analyzed. See e.g. FIG. 12.

As the temperature declines, the activity of the Nitrosomonas bacteria also declines 72° F. 50° F., the growth rate of Nitrosomonas bacteria is approaching zero. Thus, the residence time between summer and winter will be different, with the residence time in the winter being longer. Thus, is it desirable to heat the anaerobic digester, and possibly the oxidative lagoon. If desired, the oxidative lagoon can be heated in the same manner as that described for the anaerobic digester. However, the heat will more rapidly dissipate from the uncovered lagoon.

In the embodiments set forth in FIGS. 11–18 the lagoon preferably reduces the amount of organic components in the wastewater to approximately about 25 mg/l to about 1,000 mg/l and/or wherein nitrogenous wastes are reduced by denitification to about 5 mg/l to about 250 mg/l.

The flow rate to the lagoon may vary with a wide range of flows, such as about 20 ounces a minute to about 400 gallons a minute. The retention in the aeration basin should be 2 to 10 days. When the lagoon is working properly, the water furthest away from the inlet from the anaerobic digester will be the cleanest in terms of the amount of nutrients and bacterial cultures. If the clarifier performs correctly and the anaerobic and oxidative basins perform correctly, the biomass in the aeration basin is relatively low and an additional or secondary clarifier is not needed after the aeration basin. In farming areas, the aerobic basin may be large enough such that the nitrogen and organic wastes decompose with retention of about ten days. However, a certain amount of solids will continue to pass through the basin. If cleaner water is desired in the treated storage area, the water from the aerobic basin may be pumped through a secondary clarifier, flocculating chemicals may be added, and the clear water from the clarifier flows into the storage basin. The collected solids can be returned to the primary clarifier.

Once the treated water from the aerobic basin 265 has reached the proper level of nitrogen and/or COD content it is then channeled through a conduit 535 that may be operated by a mechanical or manual valve 240 into a water storage area 532 and/or is used for irrigation and/or recycling. The conduit can be comprised of a variety of materials known or used by one skilled in the art such as stainless steel and PVC. Because PVC is less costly, it is preferably used, and a 6 inch to 12 inch pipe can be used.

Again, the treated water may be used for crop irrigation 560 or it may be recycled within the water treatment apparatus itself and alternatively, it may be used to flush the floor of a hog house or livestock production area 575 with additional treatment such as reverse osmosis or ultra-filtration and disinfecting the water can be utilized as drinking water for the animal.

Approximately 98% of the solids will decompose. The non-reactive materials such as silicates, carbonates, and sulfates and other components that are not metabolized by the bacteria will accumulate in the anaerobic and aerobic basin. Eventually, the basins will have to be drained and the nonreactive material be removed. The humus matter can be used for farming or soil enrichment.

The excess water used for irrigation is pumped up to about 60 lbs per square inch to 100 lbs per square inch to spray over the fields, such as by a high pressure centrifugal pump 550, such as a Gorman Rupp high pressure centrifugal pump, or other such pumps known or used by one skilled in the art.

The pumps utilized for recycling maybe a Goulds centrifugal pump 552, such as with a 20 psi rating, or other such pumps known or used by one skilled in the art.

In this invention, a method for treating wastewater is contemplated, comprising providing a source of wastewater that comprises animal feces at least a portion of which is an insoluble solid and a nitrogenous waste, then introducing the wastewater into an inlet of a clarifier, the clarifier having a top edge and a bottom. Next, the wastewater is clarified to at least partially separate the wastewater into a clear water portion at or near the top edge of the clarifier and wherein the solids are at least partially concentrated into a solids portion at or near the bottom of the clarifier. At least a part of the clear water portion to a lagoon for nitrification and/or denitrification and/or a biological reduction of carbon. An at least a part of the solids portion is removed to an anaerobic digester for treatment, the digester containing at least one anaerobic culture, wherein at least one culture reduces the carbonaceous and organic content of the solids portion and produces a biogas comprised of methane and/or carbon dioxide and/or hydrogen sulfide. The anaerobic digester reduces the amount of organic components in the wastewater to approximately about 100 to 1,000 mg/l. Further, at least a portion of the wastewater from the anaerobic digester that has undergone an anaerobic digestion is moved to the lagoon for further treatment.

In this method, the lagoon reduces the amount of organic components in the wastewater to approximately about 25 mg/l to about 1,000 mg/l and/or nitrogenous wastes are reduced by denitification to about 5 mg/l to about 250 mg/l.

If a closed digester is used or one that is covered with a nonpermeable membrane, the biogas may be burned by a flare to deodorize and detoxify the gas, or the gas can be collected and/or stored for later use.

The anaerobic digester may also be covered with a floating cover that is nonpermeable or semipermeable. Further, semipermeable membrane may be comprised of a polymer material that allows the biogas to slowly diffuse and to become at least partially oxidized and deodorized. Further, bacteria on and/or in the membrane can be used to at least partially oxidize and deodorize the diffusing biogas.

The method of the invention also contemplates using at least one means to burn the biogas, wherein the means is selected from the group consisting of an engine; a gas generator; an electrical generator; a flare; a gas burner; and a combination thereof. The heat and/or the energy generator can be used for a production facility or for any other use.

The biogas may be burned for a heat source to elevate the temperature of the wastewater in the anaerobic digester and/or the biogas may be burned to generate electricity. As a by-product of burning the gas, heat is produced. If so desired, at least a portion of the heat may be used to raise the temperature of the water in the anaerobic digester in order to speed up the process of anaerobic digestion.

For example, a wastewater outlet line from the anaerobic digester can be connected to a heat exchanger which utilizes a heat from an engine that is burning biogas and producing a heated exhaust and an engine waste heat. The wastewater can be circulated through the heat exchanger and heated engine coolant is lead into the heat exchanger to cool the engine and to heat the wastewater circulating through the engine. The heated wastewater is returned to the anaerobic digester, and the temperature of the wastewater in the anaerobic digester is raised.

The method and apparatus of this invention also contemplates providing a wastewater outlet line from the anaerobic digester that at least partially fills a heating tank, placing a heat conductive coil in the heating tank, connecting a conduit to an exhaust pipe and/or an engine cooling system of an engine that is burning the biogas and is producing a heated exhaust and an engine waste heat, connecting the conduit from the engine to the coil, so that the heated exhaust and/or engine waste heat flows through the coil and heats the wastewater in the heating tank and cools the engine. Next, at least a portion of the heated wastewater is returned to the anaerobic digester, and the temperature of the wastewater in the anaerobic digester is raised.

Similarly, the method and apparatus of this invention contemplates providing a wastewater outlet line from the anaerobic digester that at least partially fills a heating tank, placing a heat conductive coil in the heating tank, connecting a conduit to an exhaust pipe and/or an engine cooling system of a generator that is burning the biogas and is producing a heated exhaust and a waste heat, and connecting the conduit from the generator to the coil, so that the heated exhaust and/or waste heat flows through the coil and heats the wastewater in the heating tank and cools the generator. Next, at least a portion of the heated wastewater is returned to the anaerobic digester, and the temperature of the wastewater in the anaerobic digester is raised.

In this method and apparatus of this invention contemplates that an engine may burn biogas to drive a generator and produce electricity, wherein the engine produces a heated exhaust and engine waste heat. At least a portion of the engine waste heat and/or heated exhaust is used to raise the temperature of the water. The heated wastewater can then be returned to the anaerobic digester to raise the temperature of the wastewater in the anaerobic digester and the metabolic rate of the anaerobic cultures.

Once that has occurred at least a portion of the wastewater from the anaerobic digester to the lagoon for further treatment. In the lagoon, several different zones exist depending upon the oxygen concentration therein. Preferably, there are no baffles between the zones. There is at least a first portion of the wastewater in the lagoon with at least one anoxic culture in an anoxic zone, and at least a second portion of the wastewater in the lagoon with at least one anaerobic culture in an anaerobic zone, and at least a third portion of the wastewater in the lagoon has at least one aerobic culture in an aerobic zone. The various cultures further biologically reduce carbon from the wastewater and/or reduce the nitrogen content of the wastewater.

Also in the lagoon, there is preferably at least one means for supplying exogenous oxygen to create or maintain aerobic conditions, and to cause convective flow proximate to the exogenous oxygen in the lagoon. And, at least one aerating apparatus may be used to supply exogenous oxygen. The aerating apparatus causes convective flow and aerobic conditions proximate to the aerators when the aerators are turned on, anoxic conditions away from the aerators, and the cycling of at least a portion of the wastewater from aerobic conditions to anoxic conditions and from anoxic conditions to aerobic conditions when the aerators are turned on and off.

The aerators may be controlled by an on-off switch that is manually and/or automatically operated. The supply of exogenous oxygen can be turning off when a desired oxygen level is achieved, and then at least one aerobic zone cycles from aerobic conditions to anoxic conditions and from anoxic conditions to aerobic conditions. Later, the oxygen maybe turned on when the oxygen level achieves a different pre-set level. Subsequently, there may be a cycling of the turning off and the turning on of the oxygen.

The method also contemplates determining the level of oxygen in the at least one aerobic culture zone by placing a probe in the aerobic zone or by laboratory testing of wastewater from the aerobic zone. Such methods of testing oxygen levels are well known by one skilled in the art.

In the lagoon, the nitrogenous wastes are reduced by denitification to preferably about approximately about 25 mg/l to about 1,000 mg/l and/or the nitrogenous wastes are reduced by denitification to about 5 mg/l to about 250 mg/l.

Once the water has been fully treated in the lagoon to reached the desired COD and nitrogen, at least a portion of the treated wastewater may be stored downstream from the lagoon. Further at least a portion of the treated wastewater downstream from the lagoon may be recycled such as by using the water to flush the production floor of wastes and/or at least a portion of the treated wastewater may be used for irrigation. If the water is used to clean an area where livestock wastes have accumulated, the wastewater that comprises animal feces at least a portion of which is an insoluble solid and a nitrogenous waste can be retreated by the foregoing method in the apparatus of this invention.

An apparatus for the treatment of wastewater is also contemplated by this invention. The apparatus comprises a clarifier comprising an inlet, a top edge, and a bottom, a first outlet at or near the top, and a second outlet at or near the bottom of the clarifier capable of capable of a least partially separating wastewater comprising an organic carbon component and a nitrogenous waste into a clear water portion and capable of concentrating a solids portion comprising carbonaceous and organic material from the wastewater. The concentration of the solids allows the use of an anaerobic digester of a reduced size as compare to an anaerobic digester that has solids that have not been concentrated. Further, the apparatus comprises an anaerobic digester downstream from the clarifier that contains at least one anaerobic culture for reducing the carbonaceous and organic content of the solids portion, the culture also producing a biogas.

The apparatus may also comprise a means for collecting at least a portion of a biogas produced in the anaerobic digester and for storing the biogas. In this apparatus, the biogas may be burned and used as a heat source to elevate the temperature of the wastewater in the anaerobic digester and/or the biogas may be burned to generate electricity.

Further the apparatus may comprise a means to burn at least a portion of the produced biogas. The means for burning the biogas is selected from the group consisting of an engine; a gas generator; an electrical generator; a flare; a gas burner; and a combination thereof, or other such devices known or used by one skilled in the art to burn biogas.

The apparatus may further comprise a compressor for compressing the biogas prior to storing the gas in a storage tank. Compressors that compress gas prior to storage are well known in the art. Additionally, the apparatus may further comprise an air separation unit for purifying the methane in the biogas. And a semi-permeable membrane can be used for at least partially separating methane from the biogas.

Also, in the apparatus, there is a lagoon downstream from the anaerobic digester for treating the remaining carbonaceous and organic material from the anaerobic digester and the nitrogenous components of the wastewater from at least the clearwater portion of the wastewater, the lagoon comprising at least one anoxic zone, at least one aerobic zone, and at least one anaerobic zone. Further, this is at least one anoxic culture in the anoxic zone, at least one anaerobic culture in anaerobic zone and at least one aerobic culture in an aerobic zone in the cultures further removing organic material from the wastewater and/or nitrifying and/or denitrifying the nitrogenous wastes in the wastewater.

The apparatus of the invention, further comprises at least one means for supplying exogenous oxygen to the wastewater in the lagoon that creates or maintains aerobic conditions, and that causes a convective flow proximate to the exogenous oxygen. The means for supplying exogenous oxygen is selected from the group consisting of at least one submerged aerator; at least one surface aerator; a fine bubble aerator; a coarse bubble aerator; a submerged tube with a plurality of air holes therein; a submerged pipe with a plurality of air holes therein; and a combination thereof, or, any such devices known or used by one skilled in the art for supplying exogenous oxygen. Typically, a blower is used in conjunction with the aerators. Further, the apparatus may comprise an on-off switch that manually and/or automatically controls the at least one aerator.

In the apparatus, there may also be at least one means for supplying oxygen that is controlled by an on-off switch that is manually and/or automatically operated. In this apparatus, the exogenous oxygen is preferably comprised of atmospheric air.

The apparatus may further comprise a means for turning off the exogenous oxygen when the oxygen level achieves a pre-set level for a pre-set period of time, and a means for turning on the exogenous oxygen when the oxygen level achieves a different pre-set level, wherein the wastewater in the at least one aerobic culture cycles from aerobic conditions to anoxic conditions and from anoxic conditions to aerobic conditions, and a means for cycling the turning on and off and turning on of the oxygen.

The apparatus may further comprise a means for determining the level of oxygen in the at least one aerobic culture wherein the means comprises a probe in the culture or laboratory testing of a portion of the aerobic culture.

Finally, there is a means for storing and/or using the treated wastewater downstream of the lagoon.

The apparatus may also further comprising means to add various chemicals known or used by one skilled in the art for sewage treatment. Further, the apparatus may comprise means to adjust the pH of the wastewater. The various embodiments herein described may be combined, separated and rearranged to provide a system suitable for a particular use and no one embodiment herein described shall be limited by its arrangement.

In addition to apparatuses for the treatment of wastewater, the present invention envisions a method for treating wastewater. Such method generally comprises a process involving the aforementioned embodiments. Generally, such processes comprise the steps of obtaining a wastewater, screening or otherwise separating the wastewater to remove solid particles and anaerobically digesting and/or clarifying the wastewater to produce a treated wastewater. The produced biogas may be collected and used, burned by a flare, or oxidized by a semipermeable membrane. The heat produced from the biogas may have a variety of uses, including raising the temperature of the anaerobic digester and the bacterial metabolism. The method may be modified by the addition of pretreating, further screening, clarifying, bio-tower treatment, chemical treating, and/or alternate arrangement of the steps.

It will be understood that the embodiments described above are capable of many modifications and alterations while still keeping within the scope and bounds of the Description, the description herein given is only for illustrative purposes and not intended to limit the present invention. It further will be understood by those skilled in the art that movement, passing, or pumping of wastewater through the treatment modalities of the present invention may be accomplished by any suitable method and/or device such as gravity flow or pumping and that terms to describe such movement herein are for illustrative purposes only and not intended to limit the present invention.

I claim:

1. A method for treating wastewater comprising the steps of:
   providing a source of wastewater that comprises animal feces with at least one organic carbon component at least a portion of which is an insoluable solid and a nitrogenous waste;
   introducing the wastewater into an inlet of a clarifier, said clarifier having a substantially open top, a top edge, and a bottom;
   clarifying the wastewater to at least partially separate the wastewater into a clear water portion at or near the top edge of the clarifier and wherein the solids are at least partially concentrated into a solids portion at or near the bottom of the clarifier;
   removing at least a part of the clear water portion to a lagoon for nitrification and/or denitrification and/or a biological reduction of carbon, wherein the removal is a flow of the clear water over said top edge of the clarifier;
   moving at least a part of the solids portion to an anaerobic digester for treatment, said digester containing at least one anaerobic culture, wherein said at least one culture reduces the organic content of the solids portion and produces a biogas comprised of methane and/or carbon dioxide and/or hydrogen sulfide; and
   moving at least a portion of the wastewater from the anaerobic digester that has undergone an anaerobic digestion to said lagoon for a further treatment.

2. The method of claim 1, further comprising the steps of:
   collecting the biogas from the anaerobic digester; and
   storing the biogas and/or burning the biogas.

3. The method of claim 1, further comprising the step of covering an anaerobic digester with a floating cover that is nonpermeable or semipermeable.

4. The method of claim 2, further comprising the step of covering an anaerobic digester with a semipermeable membrane comprised of a ultraviolet resistant polymer material that allows the biogas to slowly diffuse and to become at least partially oxidized and deodorized.

5. The method of claim 4, further comprising the step of using bacteria on and/or in the membrane to at least partially oxidize and deodorize the diffusing biogas.

6. The method of claim 2, further comprising the step of burning the biogas for a heat source to elevate the temperature of the wastewater in the anaerobic digester and/or burning the biogas to generate electricity.

7. The method of claim 6, further comprising the steps of:
   using an engine to burn the biogas to drive a generator and produce electricity, wherein the engine produces a heated exhaust and engine waste heat; and
   using at least a portion of the engine waste heat and/or heated exhaust to raise the temperature of the water in the anaerobic digester in order to speed up the anaerobic digester.

8. The method of claim 1, wherein the anaerobic digester reduces the amount of organic components in the wastewater to approximately about 100 mg/l to about 10,000 mg/l and/or wherein the concentration of the solids allows the use of an anaerobic digester of a reduced size as compared to an anaerobic digester that has solids that have not been concentrated.

9. The method of claim 1, wherein the lagoon reduces the amount of organic components in the wastewater to approximately about 25 mg/l to about 1,000 mg/l and/or wherein nitrogenous wastes are reduced by denitrification to about 5 mg/l to about 250 mg/l.

10. A method for treating wastewater comprising the steps of:
    providing a source of wastewater that comprises animal feces with at least one organic carbon component at least a portion of which is an insoluable solid and a nitrogenous waste;
    introducing the wastewater into an inlet of a clarifier, said clarifier having a top edge and a bottom;
    clarifying the wastewater to at least partially separate the wastewater into a clear water portion at or near the top edge of the clarifier and wherein the solids are at least partially concentrated into a solids portion at or near the bottom of the clarifier;
    removing at least a part of the clear water portion to a lagoon for nitrification and/or denitrification and/or a biological reduction of carbon;
    moving at least a part of the solids portion to an anaerobic digester for treatment, said digester containing at least one anaerobic culture, wherein said at least one culture reduces the organic content of the solids portion and produces a biogas comprised of methane and/or carbon dioxide and/or hydrogen sulfide;
    moving at least a portion of the wastewater from the anaerobic digester that has undergone an anaerobic digestion to said lagoon for a further treatment;
    treating at least a first portion of the wastewater in the lagoon with at least one anoxic culture in an anoxic zone;
    treating at least a second portion of the wastewater in the lagoon with at least one anaerobic culture in an anaerobic zone;
    treating at least a third portion of the wastewater in the lagoon with at least one aerobic culture in an aerobic zone; and
    wherein said cultures biologically reduce carbon from said wastewater and/or reduce the nitrogen content of the wastewater.

11. The method of claim 10, further comprising the step of:
    providing at least one means for supplying exogenous oxygen to facilitate nitrification and/or denitrification and/or for biological reduction of carbon, and cause convective flow proximate to said exogenous oxygen into the lagoon.

12. The method of claim 10, further comprising the step of storing at least a portion of the treated wastewater downstream from the lagoon.

13. The method of claim 10, further comprising the step of recycling at least a portion of the treated wastewater downstream from the lagoon and/or irrigating with at least a portion of the treated wastewater.

14. The method of claim 1, further comprising the step of treating the wastewater with at least one chemical upstream from the clarifier.

15. The method of claim 10, further comprising the step of using at least one of aerator in said lagoon which causes convective flow and aerobic conditions proximate to said aerators when the aerators are turned on, anoxic conditions away from said aerators, and the cycling of at least a portion of said wastewater from aerobic conditions to anoxic conditions and from anoxic conditions to aerobic conditions when said aerators are turned on and off.

16. The method of claim 15, further comprising the step of controlling at least one aerator by an on-off switch that is manually and/or automatically operated.

17. The method of claim 15, further comprising the steps of:
turning off the supply of exogenous oxygen when a desired oxygen level is achieved, wherein at least one aerobic zone cycles from aerobic conditions to anoxic conditions and from anoxic conditions to aerobic conditions;
turning on the supply of oxygen when said oxygen level achieves a different pre-set level; and
cycling said turning off and said turning on of said oxygen.

18. The method of claim 15, further comprising the step of:
determining the level of oxygen in said at least one aerobic culture zone by placing a probe in the aerobic zone and/or by laboratory testing of wastewater from the aerobic zone.

19. A method for treating wastewater comprising the steps of:
providing a source of wastewater that comprises animal feces with at least one organic carbon component at least a portion of which is an insoluable solid and a nitrogenous waste;
introducing the wastewater into a clarifier comprising an inlet, a top edge, and a bottom;
clarifying the wastewater to at least partially separate the wastewater into a clear water portion at or near the top of the clarifier and an at least partially concentrated solids portion at or near the bottom of the clarifier;
removing at least a part of the clear water portion to a lagoon for nitrification and/or denitrification and/or a biological reduction of carbon;
treating at least a portion of the wastewater in the lagoon with at least one anoxic culture in an anoxic zone;
moving at least a part of the solids portion to an anaerobic digester for a treatment, said digester containing at least one anaerobic culture, wherein said at least one culture reduces an organic content of the solids portion and produces a biogas comprised of methane and/or carbon dioxide and/or hydrogen sulfide;
collecting the biogas from the anaerobic digester;
moving at least a portion of the wastewater from the anaerobic digester to a lagoon for a further treatment by said cultures in said zones;
treating at least a first portion of the wastewater in the lagoon with at least one anaerobic culture in a zone wherein dissolved oxygen is absent;
treating at least a second portion of the clear water wastewater and/or the wastewater from the anaerobic digester in the lagoon with at least one aerobic culture in an aerobic zone in the presence of dissolved oxygen;
treating at least a third portion of the wastewater in the lagoon with at least one anoxic culture in an anoxic zone; wherein the treatment by said cultures further biologically reduces carbon material from said wastewater and/or reduces the nitrogen content of the wastewater;
storing the treated water from the lagoon for use and/or using the treated water from the lagoon; and
burning the biogas to raise the temperature of the wastewater in the anaerobic digester and/or burning the biogas the generate electricity.

20. The method of claim 19, further comprising the steps of:
providing a wastewater outlet line from the anaerobic digester;
connecting the wastewater outlet line to a heat exchanger which utilizes a heat from an engine that is burning biogas and producing a heated exhaust and an engine waste heat;
circulating the wastewater through the heat exchanger and feeding an engine coolant into said heat exchanger to cool the engine and to heat the wastewater circulating through the engine;
returning the heated wastewater to the anaerobic digester; and
raising the temperature of the wastewater in the anaerobic digester.

21. The method of claim 19, further comprising the steps of:
providing a wastewater outlet line from the anaerobic digester that at least partially fills a heating tank;
placing a heat conductive coil in the heating tank;
connecting a conduit to an exhaust pipe and/or an engine cooling system of an engine that is burning the biogas and is producing a heated exhaust and an engine waste heat;
connecting said conduit from the engine to the coil, so that the heated exhaust and/or engine waste heat flows through the coil and heats the wastewater in the heating tank and cools the engine;
returning at least a portion of the heated wastewater to the anaerobic digester; and
raising the temperature of the wastewater in the anaerobic digester.

22. The method of claim 19, further comprising the steps of:
providing a wastewater outlet line from the anaerobic digester that at least partially fills a heating tank;
placing a heat conductive coil in the heating tank;
connecting a conduit to an exhaust pipe and/or an engine cooling system of a generator that is burning the biogas and is producing a heated exhaust and a waste heat;
connecting said conduit from the generator to the coil, so that the heated exhaust and/or waste heat flows through the coil and heats the wastewater in the heating tank and cools the generator;
returning at least a portion of the heated wastewater to the anaerobic digester; and
raising the temperature of the wastewater in the anaerobic digester.

23. The method of claim 19, further comprising the step of:
providing at least one means for supplying exogenous oxygen to facilitate nitrification and/or denitrification and/or biologic reduction of carbon, and to cause convective flow proximate to said exogenous oxygen into the lagoon.

24. The method of claim 19, further comprising the steps of:
obtaining the wastewater comprising animal feces and nitrogenous wastes by flushing the floor of a livestock production facility with treated water from the lagoon.

25. The method of claim 19, further comprising the step of:
using the treated water downstream from the lagoon for crop irrigation.

26. The method of claim 19, using at least one means to burn the biogas selected from the group consisting of an engine; a gas generator; an electrical generator; a flare; a gas burner; and a combination thereof.

27. The method of claim 19, further comprising the step of:
purifying the biogas by using an air separation unit or separating gas comprising methane from the biogas by using a semi-permeable membrane.

28. An apparatus for the treatment of wastewater comprising:
a clarifier comprising an inlet, a top edge, and a bottom, a first outlet at or near the top, and a second outlet at or near the bottom of the clarifier capable of capable of a least partially separating wastewater comprising an organic carbon component and/or a nitrogenous waste into a clear water portion and a concentrate solids portion comprising organic material from the wastewater;
an anaerobic digester downstream from the clarifier that contains at least one anaerobic culture for reducing the organic content of the solids portion, said culture also producing a biogas;
a means for collecting at least a portion of a biogas produced in the anaerobic digester and/or a means to burn at least a portion of the produced biogas;
a lagoon downstream from the anaerobic digester for treating the wastewater from the anaerobic digester and the wastewater from at least the clearwater portion of the wastewater, said lagoon comprising at least one anoxic zone, at least one aerobic zone, and at least one anaerobic zone;
at least one anoxic culture in the anoxic zone, at least one anaerobic culture in anaerobic zone and at least one aerobic culture in an aerobic zone in said cultures biologically reducing carbon from said wastewater and/or nitrifying and/or denitrifying the nitrogenous wastes in said wastewater; and
a means for storing the treated wastewater downstream of the lagoon.

29. The apparatus of claim 28, further comprising a means for storing said collected biogas.

30. The apparatus of claim 28, wherein the means for burning said biogas is selected from the group consisting of an engine; a gas generator; an electrical generator; a flare; a gas burner; and a combination thereof.

31. The apparatus of claim 28, further comprising at least one means for supplying exogenous oxygen to the wastewater in the lagoon to facilitate nitrification and/or denitrification and/or biologic reduction of carbon, and to cause a convective flow proximate to said exogenous oxygen.

32. The apparatus of claim 31, wherein the means for supplying exogenous oxygen is selected from the group consisting of at least one submerged aerator; at least one surface aerator; a fine bubble aerator; a coarse bubble aerator; a submerged tube with a plurality of air holes therein; a submerged pipe with a plurality of air holes therein; and a combination thereof.

33. The apparatus of claim 31, wherein said at least one means for supplying oxygen is controlled by an on-off switch that is manually and/or automatically operated.

34. The apparatus of claim 28, further comprising a outlet wastewater line from anaerobic digester that is connected to a heat exchanger that is used to cool an engine burning biogas and producing a heated exhaust and an engine waste heat, wherein the water from the anaerobic digester is pumped into a heat exchanger and a cooling water from the engine is passed through the heat exchanger, liberating said heat from the engine to the wastewater and returning to cool the engine, and wherein a return line conveys the heated wastewater to the anaerobic digester to raise the temperature of the water in the anaerobic digester.

35. The apparatus of claim 30, wherein the biogas is burned and used as a heat source to elevate the temperature of the wastewater in the anaerobic digester and/or wherein the biogas is burned to generate electricity.

36. The apparatus of claim 30, further comprising an on-off switch that manually and/or automatically controls said at least one aerator.

37. The apparatus of claim 30, wherein said exogenous oxygen is comprised of atmospheric air.

38. The apparatus of claim 31, further comprising:
a means for turning off the exogenous oxygen when said oxygen level achieves a pre-set level for a pre-set period of time;
a means for turning on the exogenous oxygen when said oxygen level achieves a different pre-set level, wherein said wastewater in said at least one aerobic culture cycles from aerobic conditions to anoxic conditions and from anoxic conditions to aerobic conditions; and a means for cycling the turning on and off and turning on of said oxygen.

39. The apparatus of claim 37, further comprising a means for determining the level of oxygen in said at least one aerobic culture, wherein said means comprises a probe in said culture and/or laboratory testing of a portion of said aerobic culture.

40. The apparatus of claim 28, further comprising means to add chemicals upstream of the clarifier and/or adjust the pH of the wastewater downstream from the clarifier.

41. The apparatus of claim 29, further comprising a compressor for compressing the biogas prior to storing the gas in a storage tank.

42. The apparatus of claim 29, further comprising
an air separation unit for purifying the methane in the biogas and/or a semi-permeable membrane for at least partially separating methane from the biogas.

43. The apparatus of claim 29, wherein the concentration of the solids allows the use of an anaerobic digester of a reduced size as compared to an anaerobic digester that has solids that have not been concentrated.

* * * * *